(12) United States Patent
Agamy et al.

(10) Patent No.: US 12,362,681 B2
(45) Date of Patent: Jul. 15, 2025

(54) SYSTEMS AND METHODS FOR GENERATING SIGNALS

(71) Applicant: ACCELEWARE LTD., Calgary (CA)

(72) Inventors: Mohammed Agamy, Niskayuna, NY (US); Zhiyu Shen, Cary, NC (US); Jorgen S. Nielsen, Calgary (CA); Michal M. Okoniewski, Calgary (CA)

(73) Assignee: ACCELEWARE LTD., Calgary (CA)

( * ) Notice: Subject to any disclaimer, the term of this patent is extended or adjusted under 35 U.S.C. 154(b) by 162 days.

(21) Appl. No.: 18/015,824

(22) PCT Filed: Jul. 8, 2021

(86) PCT No.: PCT/CA2021/050937
§ 371 (c)(1),
(2) Date: Jan. 12, 2023

(87) PCT Pub. No.: WO2022/011454
PCT Pub. Date: Jan. 20, 2022

(65) Prior Publication Data
US 2023/0261588 A1    Aug. 17, 2023

Related U.S. Application Data

(60) Provisional application No. 63/052,714, filed on Jul. 16, 2020.

(51) Int. Cl.
*H02M 7/493* (2007.01)
*H02M 1/00* (2006.01)
(Continued)

(52) U.S. Cl.
CPC ......... *H02M 7/493* (2013.01); *H02M 1/0032* (2021.05); *H02M 1/0058* (2021.05); *H02M 7/4818* (2021.05); *H02M 7/5387* (2013.01)

(58) Field of Classification Search
CPC .... H02M 1/0032; H02M 7/493; H02M 7/497; H02M 7/5387; H02M 7/4815; H02M 7/4818; H02M 1/0058
See application file for complete search history.

(56) References Cited

U.S. PATENT DOCUMENTS

| 2,757,738 A | 8/1956 | Ritchey |
| 3,169,577 A | 2/1965 | Sarapuu |

(Continued)

FOREIGN PATENT DOCUMENTS

| CA | 2838472 A1 | 10/2005 |
| CA | 2816101 A1 | 5/2012 |

(Continued)

OTHER PUBLICATIONS

"Available power", International Electrotechnical Commission, 1992 <http://www.electropedia.org/iev/iev.nsf/display?openform&ievref=702-07-10>. (2 pages).

(Continued)

*Primary Examiner* — Alex Torres-Rivera
(74) *Attorney, Agent, or Firm* — Marks & Clerk; Maria Wei

(57) ABSTRACT

Systems and methods are provided for generating signals. The signal generator system includes a transformer unit and a plurality of converters. The transformer unit includes a primary input side and a secondary output side connectable to a load. The primary input side includes a plurality of parallel input sections and the secondary output side includes a plurality of output sections connected in series with each output section corresponding to one of the input sections. Each converter has a converter input, a converter output, and a switch module positioned between the converter input and the converter output. The switch module is operable to control a direction of current flow through the converter output. The switch module is adjustable between (Continued)

a plurality of switch states, and each converter is adjustable between a plurality of operational modes. The plurality of operational modes include at least one active mode and at least one inactive mode.

20 Claims, 21 Drawing Sheets

(51) Int. Cl.
*H02M 7/48* (2007.01)
*H02M 7/5387* (2007.01)

(56) References Cited

U.S. PATENT DOCUMENTS

| | | |
|---|---|---|
| 3,170,519 A | 2/1965 | Haagensen |
| 3,522,848 A | 8/1970 | New |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,451 A | 3/1980 | Dauphine |
| 4,301,865 A | 11/1981 | Kasevich et al. |
| 4,319,632 A | 3/1982 | Marr, Jr. |
| 4,320,801 A | 3/1982 | Rowland et al. |
| 4,449,585 A | 5/1984 | Bridges et al. |
| 4,470,459 A | 9/1984 | Copland |
| 4,487,257 A | 12/1984 | Dauphine |
| 4,508,168 A | 4/1985 | Heeren |
| 4,513,815 A | 4/1985 | Rundell et al. |
| 4,583,589 A | 4/1986 | Kasevich |
| 4,620,593 A | 11/1986 | Haagensen |
| 5,099,918 A | 3/1992 | Bridges et al. |
| 5,293,936 A | 3/1994 | Bridges |
| 6,189,611 B1 | 2/2001 | Kasevich |
| 6,208,529 B1 | 3/2001 | Davidson |
| 6,285,014 B1 | 9/2001 | Beck et al. |
| 6,521,874 B2 | 2/2003 | Thompson et al. |
| 7,075,392 B2 | 7/2006 | Smith et al. |
| 7,091,460 B2 | 8/2006 | Kinzer |
| 7,312,428 B2 | 12/2007 | Kinzer |
| 7,359,223 B2 | 4/2008 | Datta et al. |
| 7,484,561 B2 | 2/2009 | Bridges |
| 7,626,836 B2 | 12/2009 | Leggate et al. |
| 7,817,101 B2 | 10/2010 | Cowles |
| 7,891,421 B2 | 2/2011 | Kasevich |
| 8,453,739 B2 | 6/2013 | Parsche |
| 8,511,378 B2 | 8/2013 | Parsche et al. |
| 8,537,912 B2 | 9/2013 | Long et al. |
| 8,648,760 B2 | 2/2014 | Parsche |
| 8,763,691 B2 | 7/2014 | Parsche |
| 8,789,599 B2 | 7/2014 | Parsche |
| 9,664,021 B2 | 5/2017 | Hyde et al. |
| 10,760,392 B2 | 9/2020 | Okoniewski et al. |
| 10,774,629 B2 | 9/2020 | Okoniewski et al. |
| 11,359,473 B2 | 6/2022 | Okoniewski et al. |
| 2001/0011590 A1 | 8/2001 | Thomas et al. |
| 2004/0084442 A1 | 5/2004 | La Rovere |
| 2006/0079784 A1 | 4/2006 | Shifrin |
| 2006/0102625 A1 | 5/2006 | Kinzer |
| 2006/0146944 A1 | 7/2006 | Chiu |
| 2007/0215613 A1 | 9/2007 | Kinzer |
| 2007/0252568 A1 | 11/2007 | Chien |
| 2009/0173488 A1 | 7/2009 | Varma |
| 2011/0006055 A1 | 1/2011 | Diehl |
| 2011/0042063 A1 | 2/2011 | Diehl et al. |
| 2011/0051783 A1 | 3/2011 | Cahn et al. |
| 2011/0094755 A1 | 4/2011 | Corbett et al. |
| 2011/0146981 A1 | 6/2011 | Diehl |
| 2011/0253367 A1 | 10/2011 | Banerjee et al. |
| 2011/0303423 A1 | 12/2011 | Kaminsky et al. |
| 2012/0018140 A1 | 1/2012 | Parsche |
| 2012/0067580 A1 | 3/2012 | Parsche |
| 2012/0073798 A1 | 3/2012 | Parsche et al. |
| 2012/0118565 A1 | 5/2012 | Trautman et al. |
| 2012/0125609 A1 | 5/2012 | Parsche |
| 2013/0083703 A1 | 4/2013 | Granger-Jones et al. |
| 2013/0192825 A1 | 8/2013 | Parsche |
| 2013/0277045 A1 | 10/2013 | Parsche |
| 2013/0334205 A1 | 12/2013 | Wright et al. |
| 2014/0021825 A1* | 1/2014 | Ocalan ............... H03H 11/481 310/300 |
| 2014/0131032 A1 | 5/2014 | Dittmer |
| 2014/0262224 A1 | 9/2014 | Ayers et al. |
| 2014/0262225 A1 | 9/2014 | Campbell et al. |
| 2014/0290934 A1 | 10/2014 | Parsche |
| 2015/0013967 A1 | 1/2015 | Parsche |
| 2015/0180345 A1* | 6/2015 | Frost ................... H02M 3/3376 363/21.02 |
| 2015/0180352 A1 | 6/2015 | Mester et al. |
| 2015/0192004 A1 | 7/2015 | Saeedfar |
| 2015/0381401 A1 | 12/2015 | Butterfield et al. |
| 2016/0047213 A1 | 2/2016 | Grounds, III et al. |
| 2016/0097268 A1 | 4/2016 | Okoniewski et al. |
| 2019/0138809 A1 | 5/2019 | Doshi et al. |
| 2021/0384877 A1* | 12/2021 | Hardy ................. H04B 1/04 |
| 2022/0178233 A1 | 6/2022 | Nielsen et al. |
| 2023/0025144 A1* | 1/2023 | Mantov ............ H02M 3/33573 |

FOREIGN PATENT DOCUMENTS

| | | |
|---|---|---|
| CA | 2816297 A1 | 5/2012 |
| CA | 2558424 C | 4/2014 |
| CA | 2866538 A1 | 4/2016 |
| CA | 3020022 A1 | 10/2017 |
| CN | 101206266 A | 6/2008 |
| EP | 1779938 A2 | 5/2007 |
| WO | 2005091883 A2 | 10/2005 |
| WO | 2008115359 A1 | 9/2008 |
| WO | 2012067769 A2 | 5/2012 |
| WO | 2016054734 A1 | 4/2016 |
| WO | 2017177319 A1 | 10/2017 |

OTHER PUBLICATIONS

Wacker, et al., "Electromagnetic Heating for In-Situ Production of Heavy Oil and Bitumen Reservoirs", Society of Petroleum Engineers, 2011, pp. 1-14, Calgary, Canada.

International Search Report and Written Opinion mailed Nov. 2, 2021 in International Patent Application No. PCT/CA2021050937 (8 pages).

Kang et al., "A new control scheme of a cascaded transformer type multilevel PWM inverter for a residential photovoltaic power conditioning system", Solar Energy, Elsevier, Amsterdam, NL, vol. 78, No. 6, Jun. 1, 2005.

Partial European Search Report and Written Opinion mailed Nov. 22, 2023 in European Patent Application No. 2184176.0 (20 pages).

Supplementary European Search Report mailed Feb. 12, 2024 in European Patent Application No. 2184176.0 (16 pages).

* cited by examiner

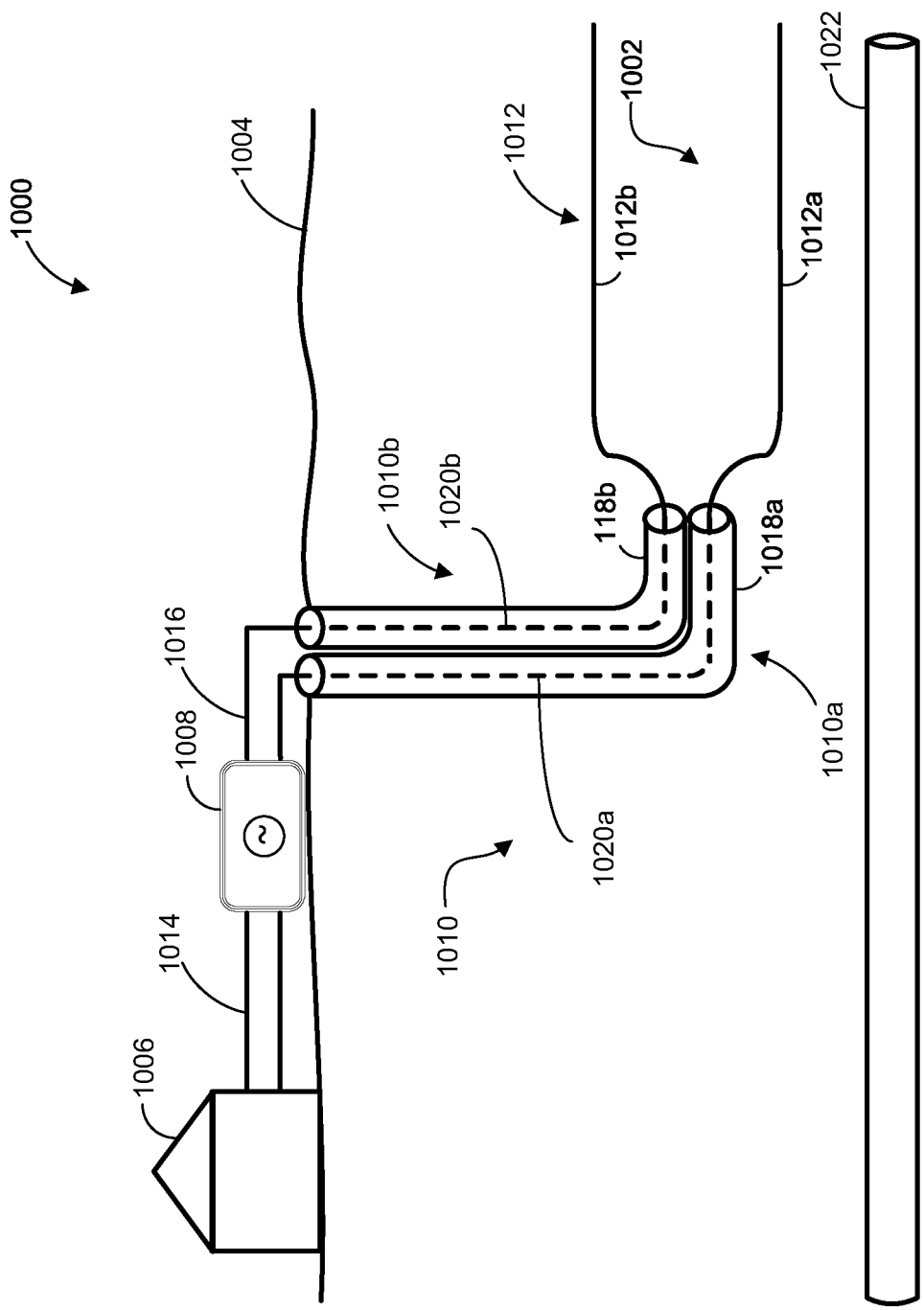

SYSTEMS AND METHODS FOR GENERATING SIGNALS

CROSS-REFERENCE TO RELATED APPLICATION

This application is a 35 USC § 371 national stage entry of International Patent Application No. PCT/CA2021/050937, filed Jul. 8, 2021, which claims priority to U.S. Provisional Patent Application No. 63/052,714 filed Jul. 16, 2020 and titled "SYSTEMS AND METHODS FOR GENERATING SIGNALS"; the entire contents of which are hereby incorporated by reference for all purposes.

FIELD

The embodiments described herein generally relate to signal generation, and in particular to systems and methods for generating an excitation signal for a frequency-dependent load.

BACKGROUND

The following is not an admission that anything discussed below is part of the prior art or part of the common general knowledge of a person skilled in the art.

Signal generators can be used to generate a variety of electrical signals. Certain electrical signals generated by a signal generator can be applied to a load in a form of electromagnetic energy. Various properties of the electrical signals and the load may affect how the energy is delivered to the load. The load may be, for example, a lumped element impedance (e.g., including resistors, inductors, and/or capacitors), an electrical machine, an antenna, or system of antennas, or a distributed load, such as, for example, a lossy transmission line, or a combination thereof. For example, the load may be a combination of a section of transmission line with low loss, and a section of a lossy transmission line or antenna or radiator that can couple electromagnetic energy to its surroundings. Further, such a section of lossy transmission line may be designed to dissipate EM energy into its surroundings, such as, for example, an underground formation in which case it may have a frequency-dependent characteristic, such as impedance, phase constant, and/or attenuation constant.

The EM energy delivered to and distributed in a load can be used to generate heat. For example, the EM energy may be used to heat hydrocarbons. Similar to traditional steam-based technologies, the application of EM energy to heat hydrocarbons can reduce viscosity and mobilize bitumen and heavy oil for production or transportation. EM heating of hydrocarbon formations can be achieved by using a load, such as an EM radiator, antenna, applicator, or lossy transmission line, positioned inside an underground reservoir to radiate, or couple, EM energy to the hydrocarbon formation. Hydrocarbon formations can include heavy oil formations, oil sands, tar sands, carbonate formations, shale oil formations, and any other hydrocarbon bearing formations, or any other mineral.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The various embodiments described herein generally relate to systems and methods for generating signals.

In accordance with an aspect of this disclosure, there is provided a signal generator system. The signal generator system includes a transformer unit and a plurality of converters. The transformer unit includes a primary input side and a secondary output side connectable to a load. The primary input side includes a plurality of parallel input sections and the secondary output side includes a plurality of output sections connected in series with each output section corresponding to one of the input sections. Each converter has a converter input, a converter output, and a switch module positioned between the converter input and the converter output. The switch module is operable to control a direction of current flow through the converter output. The switch module is adjustable between a plurality of switch states, and each converter is adjustable between a plurality of operational modes. The plurality of operational modes include at least one active mode and at least one inactive mode. The converter inputs are connected to a power supply unit. The converter outputs are connected in parallel to the primary input side of the transformer unit, where each converter output is connected to one of the input sections of the primary input side of the transformer unit. For each converter, when that converter is in any one of the active modes, the switch module is configured to switch between the plurality of switch states according to a converter switching pattern whereby an output RF signal is induced in the output section corresponding to that converter. For each converter, when that converter is in the inactive mode, the switch module is maintained in a fixed switch state whereby the converter input is decoupled from the output section corresponding to that converter.

In any embodiment, the signal generator system may further include a controller configured to adjust the operational mode of each converter. For each converter, the controller may be configured to adjust the operational mode of that converter by transmitting a converter switch signal to that converter. The converter switch signal may be usable by that converter to define the converter switching pattern and thereby the operational mode of the switch module.

In any embodiment, the controller may be configured to control a magnitude of the output RF signal by adjusting the operational mode of at least one converter. For example, the controller may be configured to control a magnitude of the output RF signal by adjusting the operational mode of at least one converter from the inactive mode to the active mode. The controller may be configured to control a magnitude of the output RF signal by adjusting the operational mode of at least one converter from a first active mode (e.g. a full bridge mode) to a second active mode (e.g. a half bridge mode).

In any embodiment, the controller may be configured to determine a desired switching pattern for each converter, and the converter switch signal transmitted to each converter may be usable by that converter to define the converter switching pattern and thereby the mode as the desired switching pattern for that converter.

In any embodiment, the controller may be configured to determine the desired switching pattern for each converter independently.

In any embodiment, the controller may be configured to determine a desired output signal to be applied to the load and determine the desired switching pattern for each converter by determining a combination of switching patterns usable to generate the desired output signal.

In any embodiment, the at least one active mode may include a plurality of active operational modes including a full bridge active mode and a half bridge active mode. For each converter, when that converter is adjusted to the full bridge active mode, the switch module of that converter may be configured to operate as a full bridge inverter. For each converter, when that converter is adjusted to the half bridge active mode, the switch module of that converter may be configured to operate as a half bridge inverter.

In any embodiment, the controller may be configured to control a magnitude of the output RF signal by cycling the operational mode of at least one converter between at least two operational modes in the plurality of the operational modes.

In any embodiment, the system may be operable in a low power mode in which a particular converter in the plurality of converters is in one of the active modes and every other converter is in the inactive mode.

In any embodiment, the signal generator system may include a controller configured to adjust the operational mode of each converter. The controller may be configured to adjust the system from the low power mode to a high power mode in which a plurality of converters are in one of the active modes. In the high power mode a switching frequency of the converter switching pattern of each converter that is operable in any of the active modes may be the same.

In any embodiment, the controller may be configured to determine an initial operational frequency while operating the system in the low power mode and to subsequently configure the system to operate in the high power mode using the initial operational frequency by setting the switching frequency of the converter switching pattern of each converter that is operable in any of the active modes to be the initial operational frequency.

In any embodiment, the controller may be configured to determine the initial operational frequency by: adjusting the particular converter to one of the active modes and adjusting all of the other converters to the inactive mode; defining a plurality of test frequencies; identifying a set of feedback measurements by, for each test frequency in the plurality of test frequencies, adjusting a switching frequency of the converter switching pattern of the particular converter to that test frequency; and determining a feedback measurement; and selecting the initial operational frequency based on the set of feedback measurements measured for the plurality of test frequencies.

In any embodiment, the feedback measurement may be determined by measuring a feedback voltage and a feedback current and identifying a phase shift between the feedback voltage and the feedback current for that test frequency. The initial operational frequency may be determined based on the set of phase shifts identified for the plurality of test frequencies.

In any embodiment, the initial operational frequency may be determined by identifying a particular phase shift from the set of phase shifts as the smallest phase shift in the set of phase shifts that satisfies specified operational constraints of the signal generator system; and defining the initial operational frequency as the test frequency corresponding to the identified particular phase shift.

In any embodiment, at least one converter in the plurality of converters may include a conditioning stage operable to adjust a level of the voltage received from the power supply unit.

In any embodiment, the system may include a controller configured to control a magnitude of the output RF signal by transmitting a voltage level signal to each converter in the at least one converter. The voltage level signal may be usable by the converter to control a voltage output of the conditioning stage.

In any embodiment, the controller may be further configured to: transmit a converter activation signal to a particular converter; and transmit a smoothing signal to the at least one converter. The converter activation signal may be usable by that particular converter to adjust that particular converter from the inactive mode to one of the active modes. The smoothing signal may be usable by the at least one converter to control the conditioning stage of the at least one converter to smooth a transition of the magnitude of the voltage through the secondary output side as the particular converter is adjusted from the inactive mode to one of the active modes.

In any embodiment, the system may further include a resonance circuit. The controller may be configured to adjust the resonance circuit based on a load reactance of the load when the secondary output side is connected to the load.

In any embodiment, the load may include at least one frequency dependent signal emission structure.

In any embodiment, the at least one frequency dependent signal emission structure may be positioned in a hydrocarbon medium.

In any embodiment, each converter may include at least one resonance capacitor coupled between the switch module and the converter output.

In any embodiment, the system may include a plurality of bypass switches, where each bypass switch is coupled to a corresponding output section in the plurality of output sections, and each bypass switch is adjustable between an open position in which the converter is coupled to the load via the output section, and a closed position in which the bypass switch defines a short circuit across the output section thereby decoupling the converter from the load.

In any embodiment, for each converter, when that converter is in the inactive mode, the fixed switch state of the switch module defines a short circuit at the converter output.

In accordance with an aspect of this disclosure, there is provided a method of generating an excitation signal for a frequency-dependent load using a signal generator having a plurality of signal generation modules. The method involves: operating the signal generator in a low power mode in which a particular signal generation module is active and all of the other signal generation modules are inactive; identifying a plurality of test frequencies; while operating the signal generator in the low power mode, identifying a set of phase shifts by for each test frequency in the plurality of test frequencies, applying a test excitation signal to the load using the particular signal generation module at that test frequency; and determining a feedback measurement resulting from the test excitation signal; and identifying an initial operational frequency based on the set of feedback measurements determined for the plurality of test frequencies; transitioning the signal generator from the lower power mode to a higher power mode by adjusting at least one of the other signal generation modules to be active; and while operating the signal generator in the higher power mode, applying the excitation signal to the load using the active signal generation modules, wherein each active signal generation module is configured using the initial operational frequency.

In any embodiment, the feedback measurement may be determined by measuring a feedback voltage and a feedback current resulting from the test excitation signal and identifying a phase shift between the feedback voltage and the feedback current for the test frequency. The initial operational frequency may be determined based on the set of phase shifts identified for the plurality of test frequencies.

In any embodiment, the initial operational frequency may be identified by: identifying one of the test frequencies as a low power target frequency based on the set of feedback measurements measured for the plurality of test frequencies; estimating a higher power target frequency using the low power target frequency and a prediction model that is defined to predict operational changes in the signal generator when adjusting from the low power mode to the higher power mode; and setting the initial operational frequency as the higher power target frequency.

In any embodiment, the prediction model may be configured to determine predicted feedback voltage and predicted feedback current when the signal generator is operating in the high power mode using the feedback measurements.

In any embodiment, the initial operational frequency may be selected based on the test frequency associated with the smallest phase shift.

In any embodiment, the initial operational frequency may be selected to increase switching efficiency by soft switching the signal generation modules.

In any embodiment, the initial operational frequency may be determined by identifying a particular phase shift from the set of phase shifts as the smallest phase shift in the set of phase shifts that satisfies specified operational constraints of the signal generator system; and defining the initial operational frequency as the test frequency corresponding to the identified particular phase shift.

In any embodiment, the method may further involve: monitoring an operational feedback voltage and operational feedback current while applying the excitation signal; and adjusting the operational frequency based on the monitoring.

In any embodiment, the method may further involve: gradually increasing the output voltage of the signal generator while transitioning the signal generator from the lower power mode to a high power mode by incrementally adjusting the output voltage of one or more active signal generator modules.

In any embodiment, the load may include at least one frequency dependent signal emission structure.

In any embodiment, the at least one frequency dependent signal emission structure may be positioned in a hydrocarbon medium.

In any embodiment, the signal generator may include: a power supply unit, a transformer unit, and the plurality of signal generation modules. The transformer unit may include a primary input side and a secondary output side connected to the load. The primary input side may include a plurality of parallel input sections and the secondary output side may include a plurality of output sections connected in series with each output section corresponding to one of the input sections. Each signal generation module may include a converter having a converter input, a converter output, and a switch module positioned between the converter input and the converter output. The switch module may be operable to control a direction of current flow through the converter output. The switch module may be adjustable between a plurality of switch states, and each converter may be adjustable between a plurality of operational modes. The plurality of operational modes may include at least one active mode and at least one inactive mode. The converter inputs may be connected to the power supply unit. The converter outputs may be connected in parallel to the primary input side of the transformer unit, where each converter output is connected to one of the input sections of the primary input side of the transformer unit. For each converter, when that converter is in any one of the active modes, the switch module may be configured to switch between the plurality of switch states according to a converter switching pattern whereby an output RF signal is induced in the output section corresponding to that converter. For each converter, when that converter is in the inactive mode, the converter input is decoupled from the output section corresponding to that converter.

In any embodiment, the signal generator may include a resonance circuit, and the method may further involve adjusting the resonance circuit based on a load reactance of the load.

In any embodiment, each signal generation module may include at least one resonance capacitor coupled between the switch module and the converter output.

In any embodiment, for each converter, when that converter is in the inactive mode, the fixed switch state of the switch module defines a short circuit at the converter output. In some examples, for each converter, when that converter is in the inactive mode, the fixed switch state of the switch module defines a short circuit at the switching module output of the converter. In some examples, for each converter, when that converter is in the inactive mode, the fixed switch state of the switch module of that converter may be configured to decouple the switching module input from switching module output.

It will be appreciated that the aspects and embodiments may be used in any combination or sub-combination. Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 9 is profile view of an example system for electromagnetic heating of a hydrocarbon formation that may be used in accordance with an embodiment;

Figure 1A:
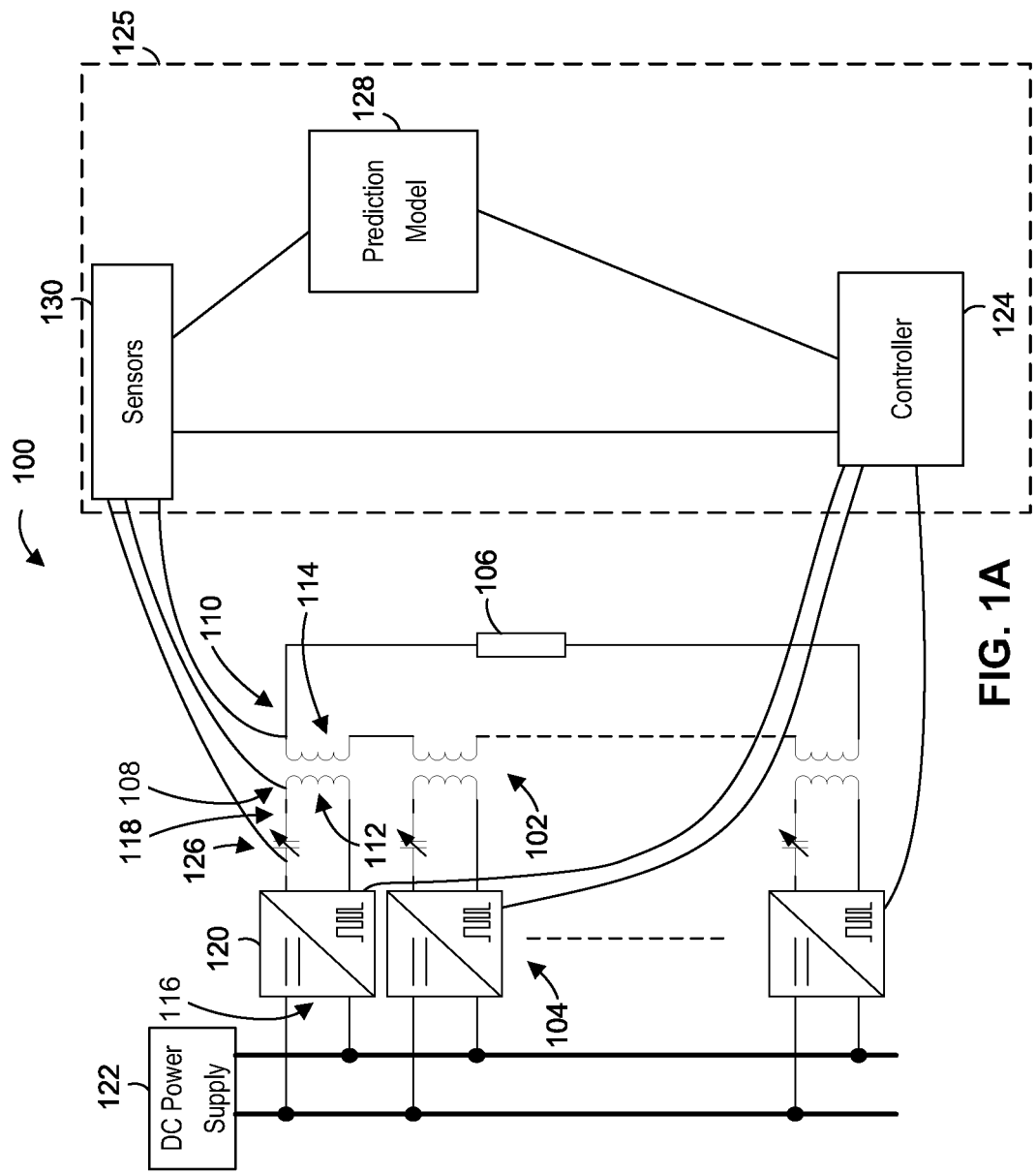
FIG. 1A is a block diagram of an example signal generator system in accordance with an embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

Embodiments described herein may relate to and/or involve the use of time-harmonic signals. As a skilled reader will appreciate, references to phase shifts or phase differences between time-harmonic (e.g. a single frequency sinusoidal) signals can also be expressed as a time delay. For time harmonic signals, time delay and phase difference convey the same physical effect. For example, a 180° phase difference between two time-harmonic signals of the same frequency can also be referred to as a half-period delay. As a further example, a 90° phase difference can also be referred to as a quarter-period delay. References to time delay(s) may be used as a more general term for comparing periodic signals. For instance, if the periodic signals contain multiple frequencies (e.g. a series of rectangular or triangular pulses), then the time lag between two such signals having the same fundamental harmonic may be referred to as a time delay. For simplicity, in the description that follows, in the case of single frequency sinusoidal signals the term "phase shift" shall be used. In the case of multi-frequency periodic signals, the term "phase shift" will be understood to refer to the time delay equal to the corresponding time delay of the fundamental harmonic of the two signals.

As used herein, the term "radio frequency" may extend beyond the conventional meaning of radio frequency. As used herein, the term "radio frequency" generally includes frequencies at which the physical dimensions of system components are comparable to the wavelength of the EM wave. System components that are less than approximately 10 wavelengths in length can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content, (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E-7 S/m), the EM wavelength at 50 kHz is 2450 meters. The length of the radiator is then approximately 0.4 wavelengths. Therefore in both wet and dry scenarios, the length of the radiator is considered comparable to the wavelength in the context of the disclosure herein. Accordingly, effects typically seen in conventional radio-frequency (RF) systems will be present and while a frequency of 50 kHz is not typically considered an RF frequency, in the disclosure herein such a system may be considered to be an RF system.

Signal generators can be used to generate a variety of electrical signals. For example, a signal generator may receive DC (direct current) or AC (alternating current) signals as an input and produce RF signals as an output.

The output signals generated by a signal generator can be applied to a load. For example, the load may provide a signal emission structure. The output signals may be applied to the load to allow the load to emit a corresponding signal. The emitted signal may be used in various applications, e.g. in heating. For example, the emitted signal may be an electromagnetic signal or a heat signal.

The efficiency of transferring an output signal from a signal generator to a load is an important factor in system design. Inefficient transfer of the output signal to the load can introduce a number of problems that may affect system-wide operations. For example, inefficient transfer of the output signal to the load can result in lower power available for the load in the form of heat. In other words, the capacity of the generator for heat transfer to the load may not be fully utilized. This may lead to increased power consumption requirements and in turn increased operational costs. Inefficient transfer of the output signal to the load may result in increased heating of the signal generator and/or the load. This may introduce increased cooling requirements and/or result in a decreased lifespan for the hardware used in the system. These problems can be exacerbated when the output signal is a high power signal. Inefficiencies may cause excessive voltage, current, or dissipation conditions that can damage the generator and/or the load.

The efficiency of transferring an output signal from a signal generator to a load can be affected by the impedance of the load. Thus, the impedance of the load may be an important factor in improving overall system efficiency. The impedance of a load may depend on the frequency of the output signal. Thus, regulating the frequency and voltage of the output signal and generator state, while taking into consideration the load impedance may help improve system efficiency.

Embodiments described herein provide systems and methods for generating signals that can be applied to a load. Embodiments described herein may provide modular signal generating systems that include a plurality of signal converter modules. Each converter module can be configured to generate a converter output signal. The converter output signals can be combined to provide the generator output signal. The operations of the individual converter modules can be controlled to provide a desired generator output signal.

The signal generating systems described herein can be highly configurable as a result of having a plurality of converter modules. The converter modules can operate in a plurality of different operational modes. Each converter module can be set to operate in a particular operational mode in response to a converter switch signal. The converter modules may be adjusted between the operational modes in response to the converter switch signals.

The converter modules can be communicatively coupled to a controller. The controller can be configured to define the converter switch signal(s) for each of the converter modules. The controller may define the converter switch signal for each converter module independently.

The converter modules may be adjusted between the operational modes without requiring manual modifications to the physical hardware of the signal generating system (e.g. rewiring). This may allow the signal generating system to be dynamically reconfigured while operational (e.g. reconfigured on-the-fly).

The operational modes of each converter module can be controlled in order to generate a desired (combined) output signal. For example, the operational modes may be controlled to provide an output signal with a desired signal frequency. Alternately or in addition, the operational modes of each converter module can be controlled to provide an output signal with a desired power level. The parameters of the combined output signal can be determined based on the operational needs of the signal generating system.

In some cases, the output signal may be defined to improve the efficiency of signal transfer to a load. For example, where the load is frequency dependent, the frequency of the output signal may be defined to provide efficient signal transfer to the load. The operational modes of the individual converter modules can then be controlled in order to provide a combined output signal with the desired signal frequency.

Embodiments described herein may provide systems and methods that are configured to determine a desired operational frequency. The desired operational frequency may be determined to improve the efficiency of signal transfer to a load (or to minimize inefficiency within operational constraints).

Signal generating systems and methods described herein may be used to determine a desired operational frequency for an excitation signal to be applied to a load. The signal generating system may be configured to operate in a low power mode. The low power mode may be used to identify the desired operational frequency for the excitation signal. The signal generating system may transition to a higher power mode when providing the excitation signal.

In the low power mode, the signal generating system can be configured to generate output signals at low power levels. The system can thus determine the desired operational frequency (and the corresponding configuration of the converter modules) while generating low power output signals. In the higher power mode, the signal generating system can be configured to generate output signals at higher power levels. The signal generating system can operate using the determined desired operational frequency upon transitioning to the high power mode. This may improve the initial system efficiency when generating high power signals. Identifying the desired operational frequency in the low power mode, before transitioning to a higher power mode, may reduce power losses in the system caused by operating inefficiently in the higher power mode.

Referring to FIG. 1A, there is shown a block diagram of an example signal generator system 100. The signal generator system 100 can be coupled to an input power supply unit 122 and a load 106. The input power supply unit 122 can be configured to generate an input power signal. The signal generator system 100 can be configured to generate an output signal using the received input power signal. The input power signal may be a DC power signal. The output signal can then be applied to the load 106. The output signal may be an RF output signal.

The load 106 can be any suitable component for receiving the output signal generated by the signal generating system 100. The load can include at least one frequency dependent signal emission structure. The frequency dependent signal emission structure can be excited by the output signal and emit electromagnetic energy, depending on the frequency of the output signal. Accordingly, the output signal may be referred to as an excitation signal. For example, the load can include, but is not limited to, a radiator, an antenna, an applicator, a lossy transmission line, an inductive heating coil, and a resistor.

The at least one frequency dependent signal emission structure can be used to heat a corresponding medium in which the emission structure is positioned. For example, the load 106 may be positioned in a hydrocarbon medium, and be used to heat the hydrocarbon medium, as will be described in greater detail with respect to FIG. 10.

As shown in FIG. 1A, the signal generator system 100 can include a transformer unit 102 and a plurality of converters 104. The converters 104 may also be referred to as signal generation modules. Although only three converters 104 are shown in FIG. 1A for ease of illustration, the signal generator system 100 can include any number of converters 104. In some cases, some of the converters 104 may be a different type in comparison to other converters 104, for example, having different sub-components and/or functions. For example, some converters 104 may include one or more conditioning stage(s) while other converters 104 do not. In some cases, each of the converters 104 may be the same.

Each converter 104 can generate a converter output signal and provide the converter output signal to the transformer unit 102. The transformer unit 102 can combine each of the converter output signals received from the plurality of converters 104 into a combined output signal. The combined output signal may then be provided to the load 106.

The transformer unit 102 can include one or more transformers. Multiple transformers (e.g., each with a separate transformer core) are shown in FIG. 1A for ease of illustration. In some cases, the transformer unit 102 may include only a single transformer. For example, the transformer unit 102 may include a single transformer with multiple primary windings and a single secondary winding, with each winding sharing a common transformer core. In some cases, the transformer unit 102 may include multiple secondary windings, which may be coupled to different loads. In some embodiments, the transformer unit 102 may include an arrangement of other components, such as capacitors, other inductors, or other components. In some cases, the transformer unit 102 may be a Wilkinson-type combiner.

The transformer unit 102 includes a primary input side 108 and a secondary output side 110. The primary input side 108 can be connected to the plurality of converters 104. The secondary output side 110 can be connected to the load 106. The transformer unit 102 can combine a plurality of signals received on the primary input side 108 into a single, combined, output signal at the secondary output side 110.

The primary input side 108 can include a plurality of input sections 112. The input sections 112 can be connected in parallel. Each input section 112 can be connected to a converter 104. In some cases, each input section 112 may correspond to a separate primary transformer winding.

The secondary output side 110 can include a plurality of output sections 114. Each output section 114 can correspond to one of the input sections 112. The plurality of output sections 114 can be connected in series. Although only three input sections 112 and corresponding output sections 114 are shown in FIG. 1A for ease of illustration, the signal generator system 100 can include any number of input sections 112 and corresponding output sections 114. Furthermore, although the output sections 114 are connected in series in FIG. 1A, other configurations of the secondary output side 110 are possible. In some cases, each output section 114 may correspond to a separate secondary transformer winding. Alternatively, each output section 114 may correspond to a section of a single secondary transformer winding.

Each input section 112 can be coupled to a corresponding output section 114 to facilitate the transfer of electrical energy from the input sections 112 to the corresponding output sections 114. For each transformer section, a signal received at the input section 112 can be transferred to the corresponding output section 114.

For example, as shown in FIG. 1A, each input section 112 can include a first coil and each output section 114 can include a second coil. In a given transformer section, when a signal travels through the first coil in the input section 112, a corresponding signal can be induced at the corresponding second coil.

When a plurality of signals are received at the plurality of input section 112 (e.g. from corresponding converters 104), each received signal can be transferred from the respective parallel input section 112 to the corresponding output section 114. The output sections 114 (connected in series) can combine the plurality of transferred signals into a single output signal. This combined output signal may then be applied to a load 106.

The plurality of converters 104 can be configured to provide a plurality of converter signals to the transformer unit 102 (e.g. via the plurality of parallel input sections 112 of the primary input side 108). Each converter 104 can receive a converter input signal from an input power supply. Each converter 104 can then generate a converter output signal to be provided to the transformer unit 102. As shown in FIG. 1A, each converter 104 can be connected to a power supply, in this example DC power supply 122. Each converter 104 can provide a corresponding signal to the corresponding input section 112 of transformer unit 102.

As shown in FIG. 1A, each converter 104 has a converter input 116, a converter output 118, and a switch module 120. The switch module 120 is positioned between the converter input 116 and the converter output 118.

The converter input 116 of each converter 104 can be connected to an input power supply unit, in this case a single DC power supply 122. Each converter input 116 can receive signals from the DC power supply 122. As shown in FIG. 1A, the plurality of converter inputs 116 can be connected in parallel to the DC power supply 122.

The converters 104 can be configured to operate in a plurality of operational modes. The converter output signal generated by a converter 104 may depend on the current operational mode of that converter 104.

Each converter 104 can be adjusted between the plurality of operational modes. In some cases, the operational mode of each converter 104 can be controlled independently. This may provide system 100 with increased flexibility in terms of overall operation. Alternately, the operational mode of two or more converters 104 may be linked. This may simplify control of system 100.

The plurality of operational modes can include at least one active mode and at least one inactive mode. When a converter 104 is operating in an active mode, the converter 104 can generate a RF signal. This RF signal can then be provided to the transformer unit 102.

When a converter 104 is in an inactive mode, the converter 104 can be configured to decouple the converter input 116 (and thereby power supply unit 122) from the converter output 118. This may prevent energy feedback to the converter input 116. Accordingly, the converter 104 may provide zero voltage to the resonant circuit 126.

In the inactive mode, the switch module 120 may be configured to decouple the converter input 116 from the converter output 118. For example, the switches in switch module 120 may be maintained in a fixed switch state that is defined to decouple the converter input 116 from converter output 118. This may also decouple the power supply unit 112 from the converter output 118.

The switch module 120 may be configured to provide a short circuit at the switch module output. The switch module can be further configured to decouple the switch module input from the switch module output. As a result, the switch module 120 may output zero voltage to the resonant circuit 126. The resonant circuit may still be coupled to the output section 114 corresponding to that converter 104.

Alternately, however, the converter 104 may generate a DC signal (e.g., a constant output voltage) while in the inactive mode. The DC signal may be provided by that converter 104 to the transformer unit 102. However, in some embodiments this DC voltage can be blocked by use of a resonance circuit, such as a resonance capacitor 126 for example.

In some cases, the DC signal may have an amplitude of zero. Alternately a non-zero DC voltage may be output by the converter 104 in the inactive mode (although this DC voltage may be blocked by resonance circuit 126). While a DC voltage from the converter 104 may be blocked by the resonance circuit 126 in the inactive mode, the RF amplitude in the inactive mode may still be non-zero.

Although FIG. 1A illustrates a single DC power supply 122 connected to the plurality of converter inputs 116, various other configurations are possible. For example, the input power supply unit may include a plurality of input power supplies. One or more converter inputs 116 may be connected to one or more independent power supplies 122. In some cases, each converter input 116 may be connected to an independent power supply 122.

The converter output 118 of each converter 104 can be connected to a corresponding input section 108 of the transformer unit 102. As shown in FIG. 1A, the plurality of converter outputs 118 can connected in parallel to the primary input side 108 of the transformer unit 102. Each converter output 118 can be connected to one of the input sections 108 of the primary input side 112 of the converter 104.

The switch module 120 of each converter 104 can be configured to control the direction of current flow through the corresponding converter output 118. The switch module 120 can be adjusted between a plurality of switch states. Each switch state may define a particular signal path through the converter 104. The switch module 120 can receive an input signal from the corresponding converter input 116. The switch module 120 can then direct current through the corresponding converter output 118.

The operation of a particular switch module 120 can depend on the operational mode of the corresponding converter 104. In one or more operational modes, the switch module 120 may provide the original signals received at a converter input 116 at the corresponding converter output 118. In one or more operational modes, the switch module 120 may be configured to, in effect, adjust or modify the signals received at a converter input 116 and provide the adjusted or modified signals at the corresponding converter output 118.

In some cases, when the converter 104 is in an active mode, the switch module 120 can be configured to switch between a plurality of switch states. The switching of the switch module 120 may be defined according to a converter switching pattern. The converter output signal generated as a result of the switching pattern can be defined to induce an output RF signal in the output section 114 corresponding to that converter 104. In some cases, when the converter 104 is in an inactive mode, the switch module 120 can be configured to maintain a fixed switch state. An output voltage of the switch module 120 (and of the signal provided through converter output 108) may then remain at a constant voltage. Accordingly, the switch module 120 may operate to decouple the converter input 116 from the output section 114 corresponding to that converter 104. The switch module 120 may thus operate as an effective short circuit from the perspective of the output section 114 corresponding to that converter 104.

Figure 1B:
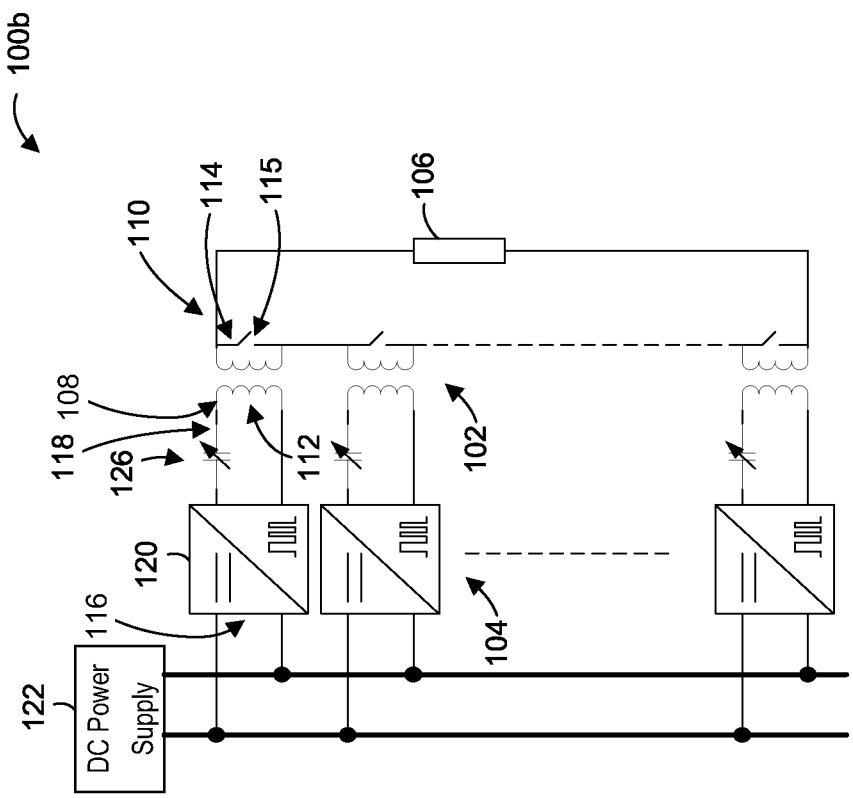
FIG. 1B is a block diagram of another example signal generator system in accordance with an embodiment.

Referring now to FIG. 1B, shown therein is another example of a signal generator system 100b. The example signal generator system 100b shown in FIG. 1B is generally similar to system 100 shown in FIG. 1A, except for the addition of an output section switch 115 (or bypass switch) to each output section 114. The output section switch 115 may be an AC switch that allows the converter 104 to be fully bypassed when in an inactive mode. The output section 114 may then be provided as an actual short circuit, when output section switch 115 is closed. This may remove any signal components that may be introduced by the resonant circuit 126 of the corresponding converter 104 while that converter 104 is inactive.

The bypass switch 115 may be adjustable between an open position, in which the converter 104 is coupled to the load 106 (via transformer unit 102), and a closed position in which the bypass switch 115 defines a short circuit across the output side 110 of transformer unit 102, thereby bypassing the corresponding converter 104.

Referring again to FIG. 1A, in general, in the inactive mode the switch module 120 is configured to maintain all of the corresponding switches 206 in a specified state. In some examples, in the inactive mode the switch module 120 may be configured to maintain a short circuit state. Alternately, in some examples, in the inactive mode the switch module 120 may be configured to maintain an open circuit state.

Figure 10A:
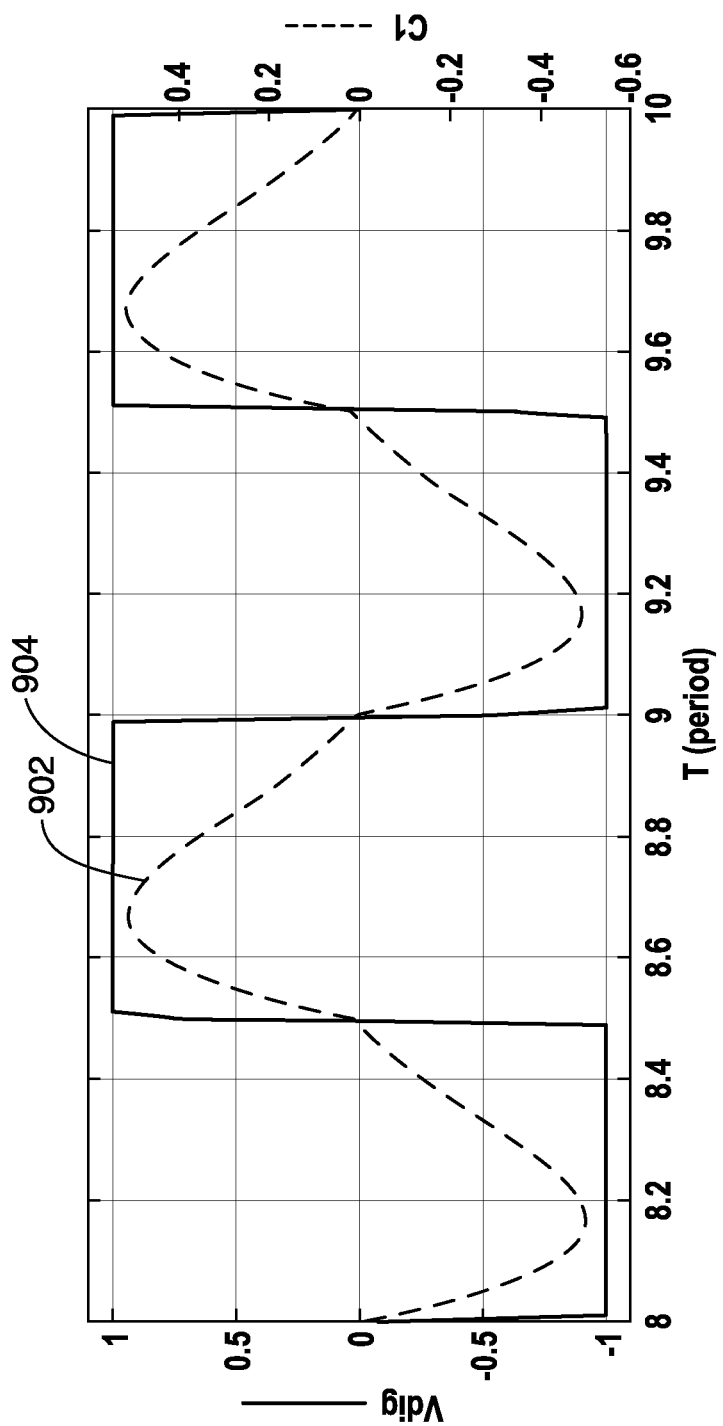
FIG. 10A is a plot illustrating an example of a converter switch pattern and output signal that may be generated during operation of the signal generator system of FIG. 1A in accordance with an embodiment.

Referring now to FIG. 10A, there is shown a plot of an example of a converter output signal 902 and a corresponding converter switch pattern 904 used to generate the converter output signal 902. As shown in the example of FIG. 10A, the converter output signal 902 has a current of approximately zero (or approaching zero) when the converter switch pattern 904 transitions between high and low states. This condition may be desirable to minimize switching losses. Under these conditions, the waveform of the output signal 902 may shift towards the left, due to a positive phase shift in the output signal 902 caused by a capacitive impedance of the load 106.

In the example shown in FIG. 10A, converter output signal 902 may have the opposite polarity as the voltage in the new switch state (but may be approaching zero) immediately prior to switching states. For example, as the switch changes from a negative polarity to a positive polarity, the current may be slightly negative but approaching zero, and as the switch changes from a positive polarity to a negative polarity, the current may be slightly positive but approaching zero.

Figure 10B:
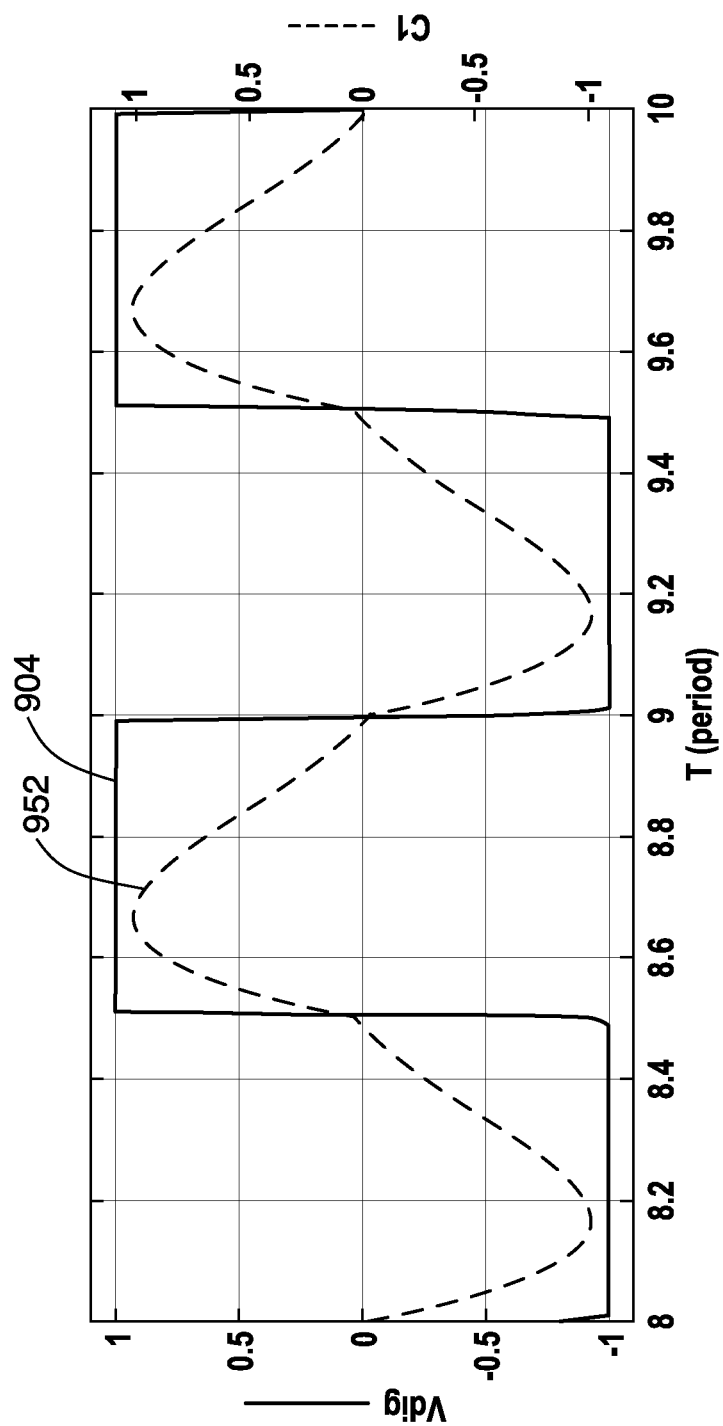
FIG. 10B is a plot illustrating another example of a converter switch pattern and output signal that may be generated during operation of the signal generator system of FIG. 1A in accordance with an embodiment.

FIG. 10B illustrates another example of a converter output signal 952 and a corresponding converter switch pattern 904 used to generate the output signal 952. In comparison to converter output signal 902, converter output signal 952 has a larger magnitude. This may be caused by the signal generator system 100 transitioning from a low power mode to a high power mode. However, the converter output signal 952 still maintains a current of approximately zero when the converter pattern 904 transitions between high and low states.

In the example shown in FIG. 10B, converter output signal 902 may have the same polarity as the voltage in the new switch state (but may be approaching zero) immediately prior to switching states. For example, as the switch changes from a negative polarity to a positive polarity, the current may be slightly positive but near to zero, and as the switch changes from a positive polarity to a negative polarity, the current may be slightly negative but near to zero. Accordingly, the switch module may result in a loss of soft switching in turn-on. This may in turn result in switching losses. In such cases, the controller 124 may be configured to determine an alternate operational frequency to minimize or avoid soft switching loss as described herein below.

Referring again to the example of FIG. 1A, each converter 104 may include a resonance circuit that includes at least one resonance capacitor 126. The resonance capacitor 126 can be coupled between the switch module 120 and the converter output 108. The resonance capacitor 126 may block DC signal components generated at the output of the switch module 120. Accordingly, the resonance capacitor 126 may operate to remove DC signal components from the signals supplied to the converter outputs 118. When a converter 104 is operating in an inactive mode, the resonance capacitor 126 may block the signal output from the switch module 120 (i.e. by blocking the DC signal components, which in this case may define the entirety of the signal output from the switch module 120). Although only one resonance capacitor 126 is shown in FIG. 1A for ease of illustration, converter 104 can include any number of resonance capacitors 126, for example, in various parallel and/or series configurations.

In the example illustrated in FIG. 1A, the resonance capacitor 126 is a variable capacitor. Alternately, the resonance capacitor 126 may be any suitable component that can block DC signal components.

Figure 2A:
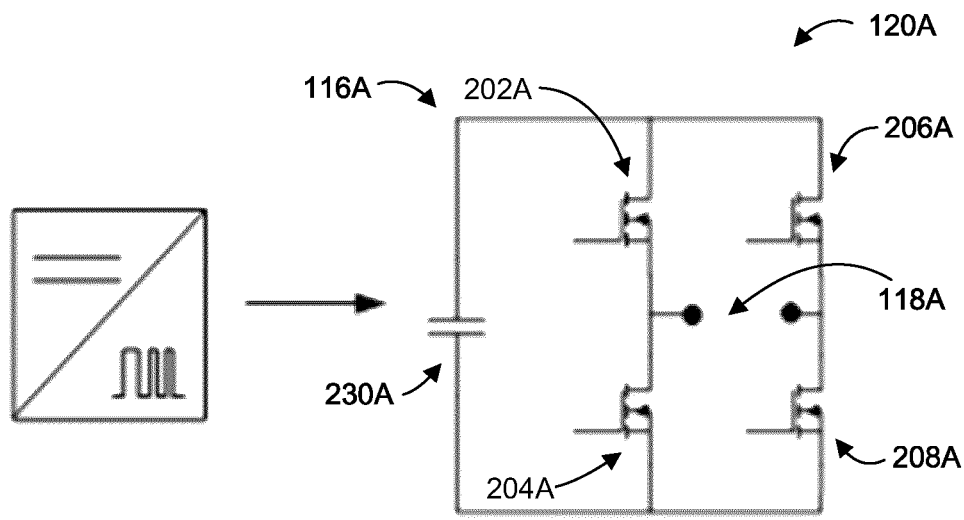
FIG. 2A is a circuit diagram of an example switch module in accordance with an embodiment.

Referring now to FIG. 2A, shown therein is an example switch module 120A. As illustrated in FIG. 2A, the switch module 120A can be represented by a circuit diagram 200A. The switch module 120A can receive an input signal at converter input 116A and provide a corresponding output signal at switch module output 118A. The output signal may then be provided to the corresponding converter output 118.

In the example illustrated in FIG. 2A, the switch module 120A includes four switches 202A, 204A, 206A, and 208A. The switches 202A, 204A, 206A, and 208A can be operated to control the output signal provide at the switch module output 118A.

In the example illustrated, the switches 202A, 204A, 206A, and 208A are arranged in an H-bridge arrangement, however various other arrangements are possible. For example, the switch module 120A may include, but is not limited to, a half H-bridge, an H-bridge, a buck converter, a buck-boost converter, a resonant converter, a soft switching converter, and/or a zero voltage switching converter. In some cases, the switch module 120A may include combinations of these arrangements, such a plurality of H-bridges connected in parallel and/or series. These combinations may be used for higher current and/or voltage applications.

Each of the switches 202A, 204A, 206A, and 208A can be configured in a closed position or an open position. When a switch is in an open position, signals can pass through the switch. Conversely, when a switch is in a closed position, signals cannot pass through the switch. The switches 202A, 204A, 206A, and 208A can be actuated from an open position to a closed position or a closed position to an open position. The switches 202A, 204A, 206A, and 208A can be any suitable type of switch, including, but not limited to, transistors, MOSFETs, BJTs, IBJTs, and/or thyristors.

The current flow through the switch module 120A depends on the particular configuration of the switches 202A, 204A, 206A, and 208A. A particular configuration of the switches 202A, 204A, 206A, and 208A may be referred to as a switch state. Each switch module 120 may be adjustable between a plurality of switch states.

For example, if switches 202A and 208A are closed (i.e., allowing current to flow) and switches 204A and 206A are open (i.e., not allowing current to flow), a positive current can flow to switch module output 118A and thereby converter output 118 (assuming a positive current is provided at converter input 116A). Similarly, if switches 202A and 208A are open and switches 204A and 206A are closed, a negative current can flow to switch module output 118A and thereby converter output 118 (again, assuming that a positive current is provided at the converter input 116A). Likewise, if switches 202A, 204A, 206A, and 208A are all open, little or no current may flow to switch module output 118A.

The operation of the switch module 120A can be controlled based on the operational mode of the corresponding converter 104. When the corresponding converter 104 is in an inactive mode, the switch module 120A can be maintained in a fixed switch state. That is, the switch state is not altered and the switches 202A, 204A, 206A, and 208A are not actuated. Rather, the switches 202A, 204A, 206A, and 208A remain fixed in their current switch state (e.g. remain open or closed respectively). As a result, the output voltage of the switch module 120A (e.g., at the switch module output 118A) can remain constant (assuming a constant input voltage). Because the voltage at the switch module output 118A (and in turn converter output 118) does not change with respect to time, little or no signal may be induced in the output section 114 of the transformer unit 102 corresponding to the converter 104.

When the corresponding converter 104 is in an active mode, the switch module 120A can be configured to switch between a plurality of switch states according to a converter switching pattern. The converter switching pattern can define the switch states to be switched between and the switch timing. For example, the converter switching pattern may define a sequence of switch states (e.g. a sequence of switch configurations for the switches in switch module 120A) and a switching period or frequency. The switch module 120A may then switch between the switch states according to the sequence of switch states and the switching period. A RF signal can generated at the switch module output 118A (and thereby converter output 118) due to the change in current flow through the switch module 120A caused by the actuations of one or more of the switches 202A, 204A, 206A, and 208A.

In general, the switches 202A, 204A, 206A, and 208A may be actuated to generate any arbitrary waveform at any frequency. The switching pattern may be defined for the switch module 120A based on the particular waveform that is desired. As a result, the signals from DC power supply 122 received at converter input 116A can be converted into a RF signal at the switch module output 118A (and thereby converter output 118. The RF signal at the converter output 118 can cause an output RF signal to be induced in the output section 114 of the transformer unit 102 corresponding to that converter 104.

The operational mode of the corresponding converter 104 may include a plurality of active operational modes. For example, the active operational modes can include a full bridge active mode and a half bridge active mode. In the full bridge active mode, the switch module 120A can operate as a full bridge inverter. That is, the switch module 120A may actuate all four switches 202A, 204A, 206A, and 208A. In the half bridge active mode, the switch module 120A can operate as a half bridge inverter. That is, the switch module 120A may actuate only two of the switches 202A, 204A, 206A, and 208A.

As shown in FIG. 2A, the switch module 120A can also include a capacitor 230A. The capacitor 230A can remove AC signal components from the signals supplied to the switch module 120A from the DC power supply 122 (e.g., via the converter input 116A).

Referring again to FIG. 1A, the signal generator system 100 can include a control system 125. The control system 125 can be configured to control the operations of converters 104 in order to generate a desired excitation signal. As illustrated in the example of system 100, the control system 125 can include a controller 124, a prediction model 128, and sensors 130. Although shown as separate components, it should be understood that the prediction model 128 can be integrated with the controller 124.

The sensor(s) 130 can include one or more sensors operable to measure properties of the components of the signal generator system 100. Sensors 130 may include a plurality of sensors operable to measure a plurality of properties of the system 100. The sensors 130 can generate sensor data that can be provided to the controller 124 and/or the prediction model 128. The sensor data can be used to determine a current operational state of the signal generator system 100. The sensor data can also be used to generate subsequent control signals for adjusting the operations of one or more converters 104.

The sensors 130 may include electrical sensors. The electrical sensors may be configured to measure electrical properties at various locations in the signal generator system 100. For example, the sensors 130 can measure current, voltage, and/or power. The sensors 130 can include any suitable electrical sensor, including, but not limited to, voltage sensors and current sensors.

Electrical sensors may be coupled to the signal generator system 100 at a plurality of electrical sensor locations. As shown in FIG. 1A, the sensors 130 can be coupled to the primary input side 108 of transformer unit 102. In some cases, the sensors 130 may be coupled to the primary input side 108 at a plurality of locations. For example, the sensors 130 may be coupled to each input section 112 of the primary input side 108. As shown in FIG. 1A, sensors 130 can be coupled to the secondary output side 110 of the transformer unit 102. In some cases, the sensors 130 may be coupled to the secondary output side 110 at a single location. Alternately, the sensors 130 may be coupled to multiple locations along the secondary output side 110. In some cases, the sensors 130 may be coupled to one or more of the converter outputs 118.

The prediction model 128 can be configured to predict various properties of the signal generator system 100. For example, the prediction model 128 can be configured to predict electrical properties at various locations in the signal generator system 100, such as the primary input side 108 and/or the secondary output side 110 of the transformer unit 102. The prediction model 128 can generate predictions based on various input parameters. The parameters can correspond to various predicted or measured properties of the signal generator system 100. The parameters can be updated using sensor data received from the sensors 130 or other data received from the controller 124. For example, the prediction model 128 may be configured to predict the voltage, current, and/or power of an output signal for a particular configuration of the converters 104 in signal generator system 100.

Although the prediction model 128 is shown as a separate component in FIG. 1A for ease of illustration, the prediction model 128 can be the same component as the controller 124, for example, being stored in a storage component or implemented in a processor (not shown). The prediction model 128 can be any suitable model, including, but not limited to a finite element model.

It may be difficult to directly measure electrical properties of the load 106, for example, when the load 106 is positioned in a hydrocarbon medium. The prediction model 128 may be used to determine load characteristics of the load 106 based on electrical properties of the converter output 118, the primary input side 108, and/or the secondary output side 110, measured by the sensors 130.

For example, the prediction model 128 may predict the presence of electrical arcing at the load 106. At low input powers, the load 106 may behave as a linear load. Accordingly, the prediction model 128 may predict an arcing condition based on sudden changes in the electrical properties of the load 106. For example, arcing may be predicted by the prediction model 128 when there is a sudden change in load characteristics as the power to the load 106 is increased, and when the change resets when the power is decreased.

The prediction model 127 may also predict the effect of the coupling between the signal generator system 100 and the load 106. For example, the load 106 may be connected to the signal generator system 100 by a transmission line. The transmission line may alter the electrical properties of the output signal produced by the signal generator system 100 such that the load 106 receives a modified output signal. The prediction model 127 may determine the changes in the electrical properties of the output signal caused by the coupling and "de-embed" electrical properties of the load 106 from the electrical properties of the coupling.

The prediction model 128 may also predict the enthalpy produced by the load 106. For instance, the power supplied to the load 106 may be predicted by the prediction model 128 based on electrical properties of the converter output 118, the primary input side 108, and/or the secondary output side 110, measured by the sensors 130. The prediction model 128 may then determine the enthalpy produced by the load 106 based on characteristics of the load 106 and the power supplied to the load 106.

The prediction model 128 may also predict various parameters of the load 128. The parameters may be used to model the load 128. For instance, the parameters may be predicted by the prediction model 128 based on electrical properties of the output signal, for example, predicted using the prediction model 128, or based on electrical properties of the converter output 118, the primary input side 108, and/or the secondary output side 110, measured by the sensors 130.

The controller 124 can be implemented using any suitable processor, controller or digital signal processor that provides sufficient processing power depending on the configuration, purposes, and requirements of the signal generator system 100. In some embodiments, the controller 124 can include more than one processor (or other suitable control element). In some cases, each processor may be configured to perform different dedicated tasks. The controller 124 may be implemented in software or hardware, or a combination of software and hardware. Although the controller 124 is shown as one component in FIG. 1A, in some embodiments, the controller 124 may be provided by one or more components distributed over a geographic area and connected via a network.

The controller 124 can include memory, include volatile memory and non-volatile storage memory (not shown). The storage memory can include RAM, ROM, one or more hard drives, one or more flash drives or some other suitable data storage elements such as disk drives, etc. The storage memory can store data in various databases or file systems. For example, the storage memory may store sensor data from the sensors 130 and/or prediction data from the predictive model 128. The storage memory may also store system configuration data, such as the number and types of converters 104, data relating to the power supply 122, configuration data relating to the load 106, medium data and so forth.

The controller 124 can transmit and receive data signals to and from other devices, including the various components of the signal generator system 100. For example, the controller 124 may receive sensor data from the sensors 130 or prediction data from the predictive model 128. The controller 124 may transmit control signals to the converters 104. The controller 124 may also transmit prediction parameters to prediction model 128.

The controller 124 can be configured to control a system operation state of the system 100. For instance, the controller 124 can control the operational state of the converters 104. The controller 124 may be configured to control the operational state of each converter 104 independently.

The controller 124 can operate to adjust the operational mode of each converter 104. That is, the controller 124 can adjust a particular converter 104 between one or more active modes and/or inactive modes. For example, the controller 124 can transmit a converter switch signal to a converter 104. The converter switch signal can be used to specify the operational mode of the converter 104.

The controller 124 may determine a desired combined operational state for the plurality of converters 104. The controller 124 may control the plurality of converters 104 in order to provide the desired operation. The controller 124 can determine desired operation states (of the system and/or controllers) based on sensor data received from the sensors 130 and/or predictions received from the prediction model 128 and/or inputs from a user specifying a desired operational state.

The controller 124 may be configured to determine a desired operational state for each converter 104. For instance, the controller 124 may determine a desired system operational state. The controller 124 may then determine the operational states of the converters that can provide the desired system operational state. The controller 124 may then define controller switch signals for each of the converters 104 corresponding to the desired operational state. The controller switch signals can be transmitted from the controller 124 to each converter 104. The converters 104 can be configured to operate in the desired operational state in response to the controller switch signal.

Through control of each of the converters 104, the controller 124 can control the overall power and frequency of the excitation signal provided to the load 106. For example, the controller 124 may control the magnitude of the excitation signal by controlling the number of converters 104 in the active and inactive mode (i.e., increasing the magnitude by adjusting more converters 104 into the active mode). Alternatively or additionally, the controller 124 may control the magnitude of the excitation signal by cycling one or more converters 104 between at least two operational modes of the plurality of operational modes. This may be used to even out the power dissipation between the plurality of converters. This cycling process may also provide a finer level of granularity in the output power generated by the system 100.

For example, the controller 104 may modulate the excitation signal by adjusting one or more converters 104 back and forth between the active and inactive modes. Alternately or in addition, the controller may modulate the excitation signal by adjusting one or more converters 104 back and forth between two or more active modes. Alternately or in addition, the controller may modulate the excitation signal by adjusting one or more converters 104 back and forth between two or more active modes and the inactive mode.

As a simple example, the controller 104 may adjust one or more converters 104 through a modulation cycle. The modulation cycle may be repeated for a predefined repetition time period. The modulation cycle can include a predefined sequence of periods during which the one or more converters 104 operate in predefined operational modes. For instance, the predefined sequence for a modulation cycle may include operating a converter 104 in a first active mode (e.g. a full bridge mode) for five cycles, operating the converter 104 in the inactive mode for two cycles, and then operating the converter 104 in a second active mode (e.g. a half bridge mode) for two cycles.

The converter switch signal can be used by the converter 104 to define a converter switching pattern for the corresponding switch module 120. The converter switching pattern can define a sequence of switch states for the switch module 120 of the corresponding converter 104. A converter switching pattern that defines a sequence of different switch states may define an active mode of the converter 104. The converter switching pattern can also define the switch timing (e.g. a switching frequency or period or pattern) when the switch module 120 should switch between the various switch states in the sequence of switch states.

In some cases, the converter switching pattern may define a fixed switch state for the switch module 120. In the fixed switch state, the switches in switch module 120 may remain in their current open/closed position without changing. A converter switching pattern that defines a fixed switch state may define an inactive mode of the converter.

In some embodiments, the converter switch signal may specify additional operational parameters for the converter 104. For example, the converter switch signal may specify a gate voltage for the switch module 120. The converter switch signal may also define a duty cycle of the switch module 120. The converter 104 can be configured to implement the desired additional operational parameter(s) in response to receiving the converter switch signal.

The controller 124 can determine a desired switching pattern for each converter 104. The controller 124 can transmit a corresponding converter switch signal to each converter 104. The converter switch signal can be used by each converter 104 to define the converter switching pattern as the desired switching pattern for that converter 104. The controller 124 can determine the desired switching pattern for each converter 104 independently. That is, the controller 124 can determine different desired switching patterns for different converters 104 and transmit a suitable converter switch signals to each converter 104.

The controller 124 may transmit a converter switch signal to some or all of the converters 104 depending on the desired operational state. For instance, where some of the converters 104 are to remain in the same operational state, the controller 124 may not transmit a converter switch signal to those converters 104. The controller 124 may transmit converter switch signals to those converters 104 whose operational state is being changed. Alternately, the controller 104 may transmit converter switch signals to all converters 104. Alternately or in addition, the controller 104 may transmit converter switch signals to some or all of the converters 104 on a regular (e.g. periodic basis).

The controller 124 can determine the desired switching pattern for each converter 104 based on a desired output signal. For example, the controller 124 can determine a desired excitation signal to be applied to the load 106. The controller 124 can then determine a desired switching pattern for each converter 104 by determining a combination of switching patterns usable to generate the desired excitation signal.

As noted above, the signals output by the individual converters 104 may be combined through the transformer unit 102. Thus, the converter output signals at converter outputs 118 can be transferred through the corresponding input sections 112 to the output sections 114. The transferred signals at the output sections 114 can be combined to define the excitation signal. The controller 124 can determine a switching pattern for each converter 104 that causes each converter 104 to output a signal that, when combined with the signals from all of the converters 104 at the secondary side of transformer unit 102, results in the desired excitation signal.

Optionally, the signal generator system 100 may also include a resonance circuit (not shown). The resonance circuit can be adjusted to modify the output reactance of the signal generator system 100. The controller 124 can adjust the resonance circuit based on the reactance of the load 106 when the secondary output side 110 of the transformer unit 102 is connected to the load 106.

The signal generator system 100 can be configured to operate in a plurality of different power modes. The plurality of different power modes can include a low power mode and one or more higher power modes. The controller 124 can adjust the current power mode of the signal generator system 100 (e.g., from the low power mode to a higher power mode, from the higher power mode to the low power mode, between two higher power modes etc.) by adjusting the operational mode of one or more converters 104.

In the low power mode, the system 100 includes a particular converter 104 operating in an active mode. The remaining converters 104 in the plurality of converters 104 can operate in an inactive mode.

In a higher power mode, the system 100 can include a plurality of converters 104 operating in an active mode. In the higher power mode, the switching frequency of the converter switching pattern of each converter operating in an active mode can be the same. In the higher power mode, the phase of the converter switching pattern of each converter operating in an active mode may also be the same. For example, the phases may be synchronized by introducing time delays in the converter switch signals.

The signal generator system 100 can include multiple high power modes. For example, the system 100 may include various high power modes that depend on the number of converters 104 in an active operational mode. For instance, the system 100 may operate in a first high power mode with two converters 104 in an active mode and a second high power mode with three converters 104 in an active mode.

The system 100 may also include other operational modes. For example, the system 100 may operate in a sleep mode in which all the converters 104 are operating in an inactive mode.

The power of the output signal from the system 100 (e.g. the excitation signal to be applied to the load 106) is generally higher when the signal generator system 100 is in a high power mode as compared to the low power mode.

When a converter 104 operates in one of the active modes, a RF signal is output by that converter 104 to the input side 108 of the transformer unit 102. However, when a converter 104 is in the inactive mode, a DC signal is output by that converter 104 to the input side 108 of the transformer unit 102. In general, only RF signals receive at the input side 108 may induce a corresponding signal at the secondary output side 110 of the transformer unit 102, the power of the output signal may tend to correspond to the number of converters 104 that are in one of the active modes.

Figure 3A:
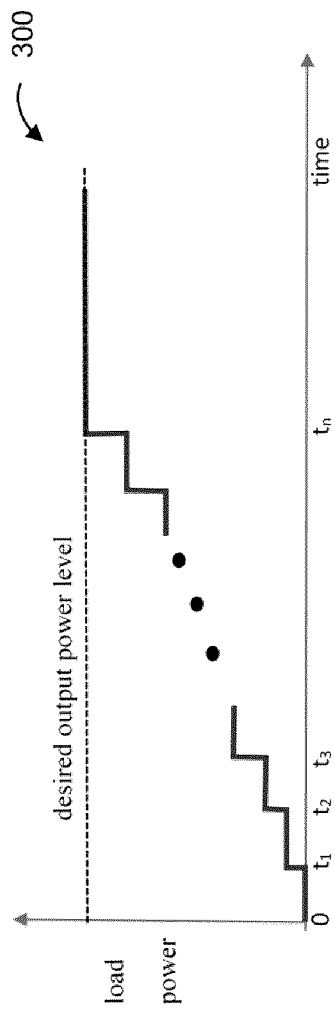
FIG. 3A is a plot illustrating an example of output power that may be generated during operation of the signal generator system of FIG. 1A in accordance with an embodiment.
Figure 3B:
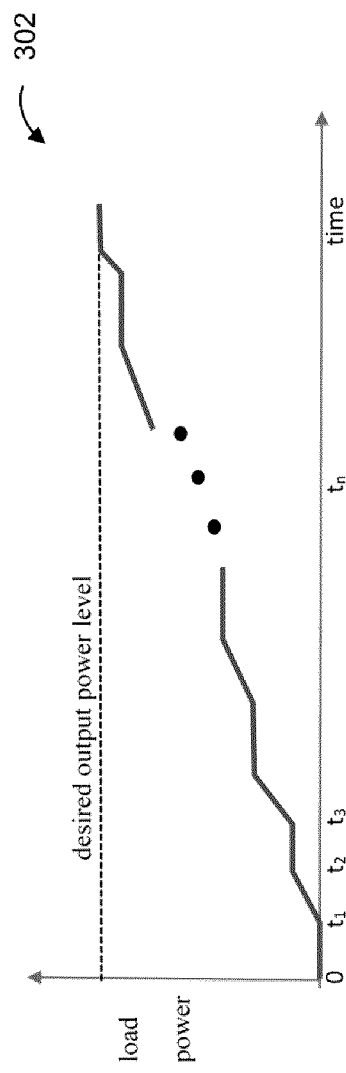
FIG. 3B is a plot illustrating another example of output power that may be generated during operation of the signal generator system of FIG. 1A in accordance with an embodiment.

Reference is now made to FIGS. 3A and 3B, which two plots are shown illustrating the characteristics of output signals generated by system 100 over a period of time. The plots illustrated in FIG. 3 show an example of the output power generated by system 100 as the signal generator system 100 is adjusted from a low power mode to a high power mode. In particular, FIGS. 3A and 3B includes two graphs 300 and 302, which show the power of the output signal with respect to time.

At $t_1$, the signal generator system 100 is operating in the low power mode. Only one converter in the plurality of converters 104 is in one of the active modes. All of the other converters are in the inactive mode. As a result, the power of the output signal is relatively low.

At $t_2$, the signal generator system 100 is adjusted to a first high power mode. The controller 124 adjusts the operational mode of some of the converters that are in the inactive mode to one of the active modes. (For example, the controller 124 can transmit converter switch signals to these converters.) As a result, the power of the output signal increases relative to at $t_1$.

At $t_3$, the signal generator system 100 is adjusted to another high power mode. The controller 124 further adjusts some of the remaining converters that are in the inactive mode to one of the active modes. The power of the output signal increases relative to at $t_2$.

As shown in FIG. 3B, in some embodiments, the signal generator system 100 may be configured to smooth the transition between different power modes. For example, when the signal generator system 100 is transitioned from a lower power mode to a higher power mode, the output voltage of the signal generator system 100 can be gradually increased. The output voltage can be gradually increased by gradually adjusting the output voltage of one or more of the active converters.

Referring again to FIG. 1A, the controller 124 can control the operational parameters of the converters 104 in order to control the magnitude of the output signal. In particular, one or more of the switch modules 120 may include a conditioning stage that can be controlled by the controller 124. In some cases, each switch module 120 may include a conditioning stage that can be controlled by the controller 124.

Figure 2B:
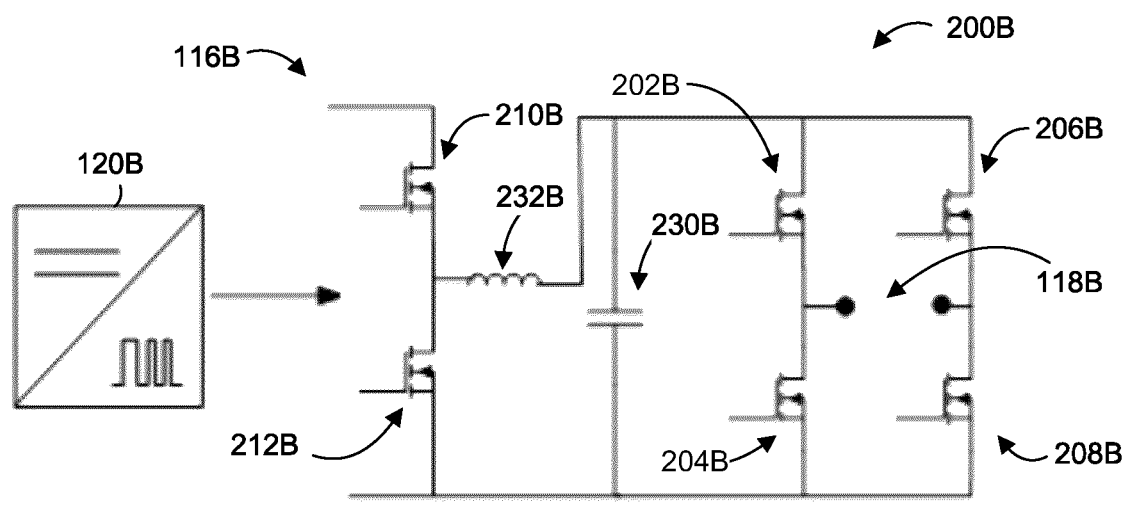
FIG. 2B is a circuit diagram of another example switch module in accordance with an embodiment.

Referring now to FIG. 2B, there is shown another example switch module 120B, which is represented by an equivalent circuit 200B. Similar to switch module 120A, switch module 120B also includes switches 202B, 204B, 206B, and 208B and capacitor 230B. However, in contrast to switch module 120A, switch module 120B includes a conditioning stage.

In the example illustrated, switches 210B and 212B, the inductor 232B, and the capacitor 230B can operate as a conditioning stage for switch module 120B. The condition stage can be used to adjust the level of DC voltage received from the DC power supply 122 (e.g., via the converter input 116B). The conditioning stage can be configured to adjust the switches 210B and 212B to control the flow of current through the inductor 232B and the capacitor 230B.

When switch 210B is closed and switch 212B is open, current can flow through the inductor 232B to the switch module output 118B (via the switches 202B and 206B) and thereby converter output 118. However, the current (and corresponding voltage) can be reduced, when a portion of the current is stored as energy in the inductor 232B and the capacitor 230B. When switch 210B is open and switch 212 is closed, current flows from stored energy of the inductor 232B and the capacitor 230B. However, the current (and corresponding voltage) may be less than that supplied by the DC power supply 122 (e.g., via the converter input 116B), depending on how much energy was stored in the inductor 232B and the capacitor 230B. As a result, the conditioning stage can reduce the voltage output at the converter output 118.

Although the conditioning stage is shown as a buck converter (e.g., the particular arrangement of the switches 210B and 212B, the inductor 232B, and the capacitor 230B) in FIG. 2B for ease of illustration, other types of conditioning stages are possible, for example, using other components and/or other arrangements thereof.

The system 100 may include one converter 104 with a conditioning stage. Alternately, the system 100 may include a plurality of converters with a conditioning stage. In some examples, all of the converters 104 may include a conditioning stage.

The controller 124 can be configured to control the operation of the conditioning stages of corresponding switch modules 120. The controller 124 can adjust the operation of the condition stage of a particular converter 104 in order to control the magnitude of the converter output signal provided by that converter 104. For example, the controller 124 may transmit a voltage level signal to a converter 104 having a condition stage. The controller 124 can be configured to transmit voltage level signals to each converter 104 that has a conditioning stage. Each corresponding converter 104 can adjust the operation of its condition stage in response to the voltage level signal in order to control the voltage level of the signal output by the conditioning stage.

The controller 124 can determine the configuration of the condition stage necessary to provide the desired output voltage. The controller 124 can then define the voltage level signal to cause the converter 104 to actuate the signal conditioning stage in a specified manner in order to provide that desired output voltage. For instance, the controller 124 can define the voltage level signal to cause the conditioning stage (e.g. a buck converter stage) to reduce the voltage output by a switch module 120.

The controller 124 can also determine the configuration of one or more conditioning stages usable to smooth the transition between system operational modes. For instance, the controller 124 can determine a desired configuration of one of more conditioning stages in order to smooth the transition of a converter 104 being adjusted from an inactive mode to an active mode (e.g., adjusting the signal generator system 100 from a low power mode to a high power mode).

The controller 124 may determine a specified configuration, or sequence of configuration, for the conditioning stage of the converter 104 being adjusted. Alternately or in addition, the controller 124 may determine a specified configuration, or sequence of configuration, for the conditioning stage of one or more other converters 104. The specified configuration, or sequence of configurations, can be determined to smooth the change in voltage level of the excitation signal generated by the system 100. The controller 124 can transmit corresponding voltage level signals to the one or more converters 104 in order to provide the smoothing operation.

The controller 124 can transmit a converter activation signal to a particular converter. The converter 104 can adjust from an inactive operational mode to an active operational mode in response to the converter activation signal. The controller 124 can also transmit a smoothing signal (e.g. a voltage level signal) to one or more converters 104 having a conditioning stage. The smoothing signal can be used by those converters 104 to provide a smoothing operation. The converters 104 receiving the smoothing signal can be configured to smooth a transition of the magnitude of the voltage at the secondary output side 110 of the transformer unit 102 (e.g., the output signal) as the converter 104 is adjusted from an inactive mode to an active mode.

In some cases, the controller 124 may automatically adjust the signal generator system 100 from a high power mode to a low power mode (or to the sleep mode). For example, the controller 124 may detect a low power trigger condition for system 100. The controller 124 can then define one or more converter control signals in response to the low power trigger condition. The converter control signals can be configured to adjust the operational mode of one or more converters 104 to the inactive mode in order to transition the system 100 to the low power mode.

The low power trigger condition may include identifying a system component that is operating outside of a desired or permitted operational range. An example of a low power trigger condition can include detecting a current or voltage at a system component that is outside an operational range. Another example of a low power trigger condition can include detecting a switch module 120 with one or more switches operating outside of an operational switch frequency range. Another example of a low power trigger condition can include detecting a switch module 120 in which one or more switches fails to soft-switch and is instead hard-switching.

Various other types of low power trigger conditions may also be used. For instance, a user may initiate a low power trigger condition to adjust the system 100 to a low power or sleep mode. As another example, a low power trigger condition may occur where a medium being heated has reached a desired temperature and thus the system 100 may be cycled to a low power mode to avoid overheating the medium.

The controller 124 can be configured to determine desired operational parameters of system 100. The desired operational parameters may be determined based on various operational characteristics, such as desired heating levels, desired operational efficiency etc. The controller 124 may be configured to determine desired operational parameters that improve the operational efficiency (e.g. the input power required to provide a certain level of heating) of system 100.

The desired operational parameter(s) can include a desired frequency of the excitation signal. The desired frequency of the excitation signal may be determined as a signal frequency that can be applied to the load 106 by the signal generator system 100 with relatively high efficiency. That is, the desired frequency of the excitation signal may be determined to reduce or minimize signal transfer losses when the signal is applied to load 106.

The controller 124 may be configured to determine the desired frequency while the system 100 operates in the low power mode. This may allow the controller 124 to evaluate a plurality of different potential frequencies while minimizing power losses that may occur from operating inefficiently in the high power mode. When the controller 124 has determined the desired frequency while operating in the low power mode, the controller 124 may transition the system 100 to a higher power mode. The desired frequency can then be set as an initial operational frequency for the system 100 in the higher power mode. That is, the system 100 can be configured to initially generate an excitation signal having the desired operational frequency. The controller 124 can define the converter switching pattern of each converter 104 that is to operate in an active mode (in the particular higher power mode) to include a switching frequency corresponding to the initial operational frequency.

Figure 4:
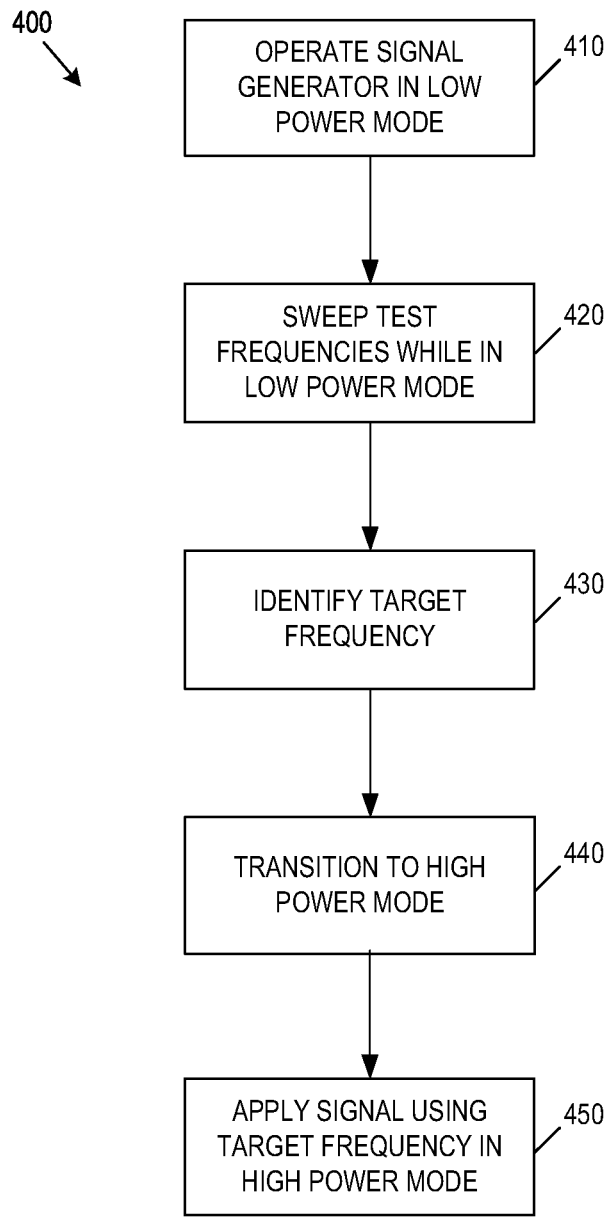
FIG. 4 is a flowchart of an example signal generation method in accordance with an embodiment.

Reference is now made to FIG. 4, which illustrates an example method 400 of determining an initial operational frequency for a signal generator system. Method 400 may be implemented using a signal generator system such as the signal generator system 100. For ease of exposition, method 400 will be described in the context of the example signal generator system 100, although it should be understood that method 400 may also be implemented using other suitable signal generator systems.

At 410 the signal generator system 100 can operate in a low power mode. As described herein above, in the low power mode, a particular converter of the plurality of converters 104 is in an active operational mode and all of the other converters are in an inactive operational mode.

At 420, a plurality of test frequencies can be evaluated. The test frequencies (which may also be referred to as sweep frequencies) can be evaluated while the system 100 is operated in the low power mode. The signal generator system 100 can be configured to perform an evaluation sweep across a range of test frequencies. The evaluation sweep may be a continuous sweep. Each test frequency can be evaluated based on one or more feedback measurements made at that test frequency. For example, each test frequency may be evaluated to identify a phase shift corresponding to that test frequency.

Controller 124 may identify a plurality of test frequencies. For each test frequency, a test excitation signal can be applied to the load 106. The test excitation signal can be generated using the active converter 104 configured to operate with a configuration defined to generate that test frequency. The controller 124 can transmit a converter switch signal to the active converter to adjust the converter switching pattern of that converter 104 so that the output signal of the signal generator system 100 has the test frequency. The output signal having the test frequency can be applied to the load 106 via the secondary output side 110 of the transformer unit 102.

A corresponding feedback voltage and feedback current resulting from the test excitation signal can be measured. The feedback voltage and feedback current can be used to identify a phase shift between the feedback voltage and the feedback current for that test frequency. The sensors 130 can be used to measure a voltage and current applied to the load 106. A phase shift can be determined based on the measured voltage and current. The phase shift can be defined by the amount the phase of the current lags the phase of the voltage. The phase shift may also be referred to as the reactance. A ratio of the amplitudes of the measured current and voltage can also be determined. The ratio of the amplitudes may also be referred to as a resistance. This process can be repeated for each test frequency.

At 430, a target frequency can be identified. The target frequency may be referred to as the desired operational frequency. The target frequency can be determined based on the feedback measurements determined for the plurality of test frequencies. For example, the target frequency can be determined based on the set of phase shifts identified for the plurality of test frequencies. For instance, the target frequency may be determined by selecting the test frequency corresponding to a desired phase shift. The set of phase shifts corresponding to the plurality of test frequencies represent the reactance of the load 106 at each test frequency. The target frequency may be determined to minimize the reactance of the load 106 when the system 100 operates in a higher power mode. For example, the target frequency may selected based on the test frequency associated with the smallest phase shift.

The reactance of the load 106 is a measure of the opposition that the load 106 presents to an output signal provided by the signal generator system 100. By selecting a target frequency that minimizes the reactance of the load 106, the signal generator system 100 can more efficiently transfer the output signal to the load 106 and the output signal can have a higher power level. A test frequency associated with a phase shift having a value of 0 may be referred to as a resonant frequency. In some embodiments, the target frequency can be defined as the resonant frequency.

Alternately, the target frequency may be selected to provide a desired level of reactance. For instance, the target frequency may be selected to provide a positive reactance value. In some cases, the target frequency may be selected to provide a positive reactance value less than 30°. In some cases, the target frequency may be selected to provide a positive reactance value less than 25°. In some cases, the target frequency may be selected to provide a positive reactance value less than 22.5°. In some cases, the target frequency may be selected to provide a positive reactance value less than 20°. In some cases, the target frequency may be selected to provide a positive reactance value less than 17.5°. In some cases, the target frequency may be selected to provide a positive reactance value less than 15°.

Alternately or in addition, the target frequency may be selected based on a test frequency associated with a particular resistance. The target frequency can be selected based on a desired power level of the output signal that results when the load 106 has the particular resistance. For example, the target frequency can be selected to minimize the resistance of the load 106. By minimizing the resistance of the load 106, the power level of the output signal may be maximized.

The target frequency may also be selected to provide a desired relationship between the load reactance and load resistance. For example, the target frequency may be selected to provide a reactance that is less than the resistance of the load 106.

The target frequency can be determined to maximize overall system efficiency. Accordingly, the target frequency need not provide an absolute minimum reactance for the load 106. For example, the target frequency can be selected to increase switching efficiency by soft switching the converters 104. Soft switching may be referred to zero voltage switching or zero current switching. Soft switching efficiency generally relates to the switch losses of the switch modules 120 of the converters 104. The switch losses can be caused by delays of a switch actuating between open and closed states (or vice versa). The target frequency may be selected while accounting for these delays. The target frequency may thus be selected to reduce or minimize the switching losses of the switch modules 120 and increases the soft switching efficiency of the converter 104. For example, the target frequency may be selected so that the current lags behind the rising edge of the voltage, and/or the amplitude of the current is near zero when a switch actuates.

In some embodiments, the target frequency may be selected based on an objective function. The objective function can be defined to weight two or more objectives. For example, the objective function may include minimizing reactance as one objective and maximizing soft switching efficiency as another objective. The objectives may include any of the criteria for determining the target frequency described herein. Each objective can be assigned a different weight based on its relative importance. For instance, an objective with greater importance may be assigned a greater weight. The target frequency may be selected by optimizing the objective function so that the objective function is maximized or minimized.

The target frequency may be constrained by operational parameters of the system 100. System components may have a limited operational range. The target frequency may thus be constrained to frequencies that allow the system components to operate within the restricted operational range.

For example, the target frequency may be selected to maintain a stress level of one or more of the components of the signal generator system 100 below a specified stress rating. The switches of the switch modules 120 may have a switching frequency rating, above which a switch module 120 may be damaged. The target frequency may thus be constrained by this switching frequency rating. At low reactance and/or resistance levels, some components of the signal generator system 100 may be subject to high voltages and/or high currents, which may cause damage the components. The target frequency can be constrained in order to maintain the risk of damage to the components of the signal generator system 100 at an acceptable level.

In some examples, the target frequency may be determined by initially identifying a potential target frequency corresponding to a smallest or minimum phase shift (i.e. load impedance angle). The minimum phase shift may then be evaluated to determine if operating the system using the potential target frequency may result in the system 100 operating outside of specified operational constraints (e.g. operational range(s) of system components, soft switching requirements). If the minimum phase shift satisfies the operational constraints, the potential target frequency may be selected as the target frequency.

If the minimum phase shift violates (i.e. does not satisfy) one or more specified operational constraints, an additional potential target frequency may be identified with an adjusted phase shift that satisfies the specified operational constraints. The additional potential target frequency may be identified as a test frequency having a minimum phase shift while still satisfying the specified operational constraints.

Alternately, the target frequency may be determined using the phase shift between the resonance circuit input current and the resonance circuit 126 input voltage (i.e. the phase shift at converter output 118). This phase shift may selected to ensure that the target frequency provides soft switching for the switch module 120.

The target frequency may also be determined while taking into account differences between the low power mode (e.g., in which the set of phase shifts is determined) and the high power mode (in which an output signal having the target frequency may be generated) of the signal generator system 100. For example, in the high power mode, higher voltage and/or current levels can be present in various components of the signal generator system 100. Expected changes to the operation of the system 100 as a result of these changed operational levels may thus be used to determine whether the target frequency should be adjusted when applied at the higher power mode.

The prediction model 128 may be configured predict operational changes in the signal generator system 100 when adjusting from the low power mode to a high power mode. A low power target frequency can be first identified based on the set of phase shifts identified for the plurality of test frequencies. A higher power target frequency can then be estimated using the low power target frequency and the predicted operational changes. The initial operational frequency of the system 100 in the higher power mode can then be set as the higher power target frequency.

In some embodiments, the prediction model 128 can determine a predicted feedback voltage and a predicted feedback current when the signal generator system 100 is operating at the high power mode using the measured feedback voltage and feedback current (i.e., measured when the signal generator system 100 is operating at the low power mode). For example, the sensors 130 can be used to measure a voltage and current applied to the load 106 when the signal generator system 100 is operating in the low power mode. The prediction model 128 can predict the voltage and current that would be applied to the load 106 if the signal generating system 100 was adjusted from the low power mode to a high power mode.

At 440, the signal generator system 100 can transition from the lower power mode to a higher power mode. That is, at least one of the other inactive converters 104 can be adjusted to the active mode. For example, the controller 124 can transmit a converter switch signal to one or more inactive converters 104 to adjust the converter switching pattern of those converters 104 from an inactive mode to an active mode.

At 450, while operating the signal generator system 100 in the higher power mode, an excitation signal is applied to the load 106 using the active converters 104. Each active converter 104 can be configured to use the target frequency as its initial operational frequency. For example, the controller 124 can transmit converter switch signals to the active converters 104 that adjust the converter switching pattern of those converters 104 so that an output signal is produced having the target frequency.

In some embodiments, the initial operational frequency (i.e. the target frequency) can be subsequently adjusted. While applying the output signal, an operational feedback voltage and operational feedback current can be monitored. The operational frequency can be adjusted based on the monitoring. For example, the sensors 130 can monitor the current and voltage of the output signal applied the load 106 (e.g., at the secondary output side 110 of the transformer unit 102). The frequency of the output signal can be adjusted in response to the measured current and voltage. For example, the reactance of the load 106 may change over time. For instance, the reactance of the load 106 may be affected by its environment and may change over time as the load 106 heats the environment. The reactance of the load 106 can be monitored by making voltage and current measurements and the frequency of the output signal can be adjusted based on changes in the reactance.

The initial operational frequency may be adjusted based on similar criteria used initially to select the target frequency. For example, the initial operational frequency may be adjusted to minimize reactance, to maintain soft switching, and/or to optimize an objective function.

Figure 5:
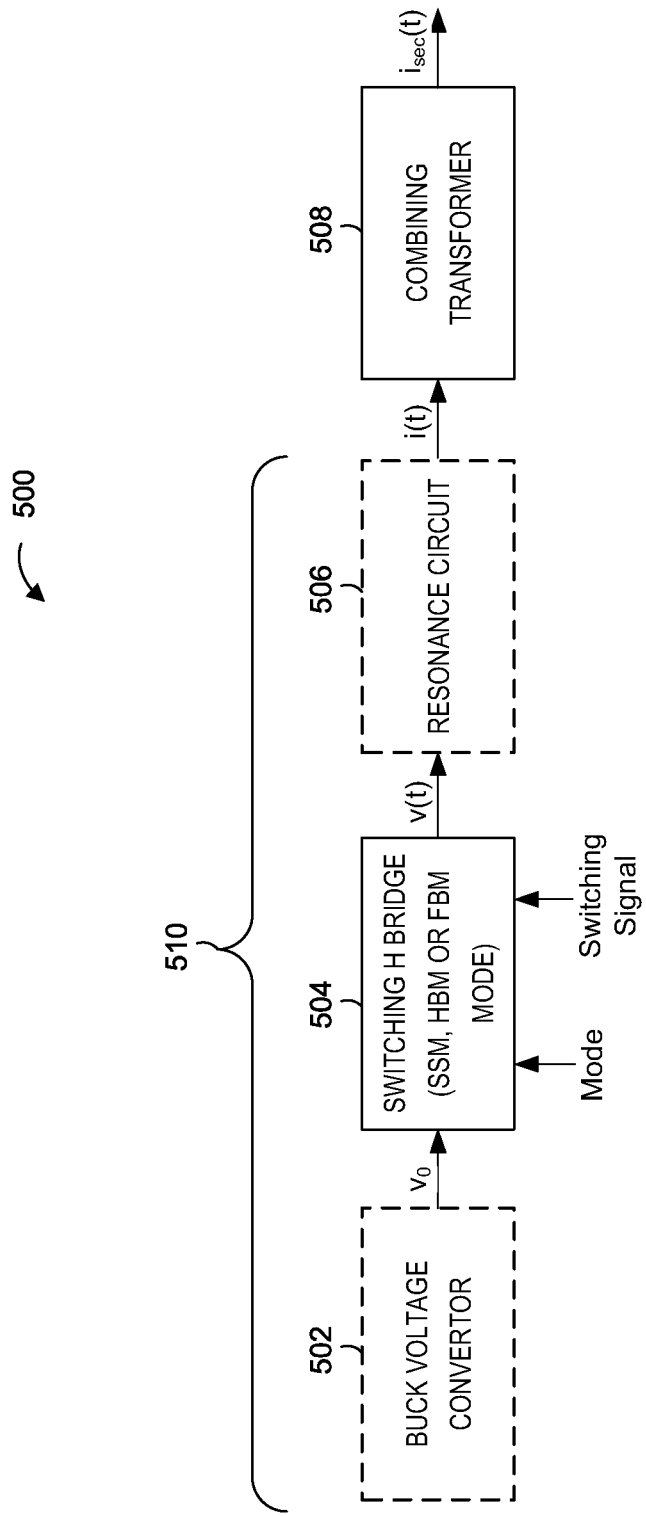
FIG. 5 is a block diagram of an example signal generator system in accordance with an embodiment.

Referring now to FIG. 5, shown therein is a block diagram of an example signal generator system 500. FIG. 5 will be used to describe the electrical properties of the signal generator system 500 mathematically.

In the example of FIG. 5, signal generator system 500 can include a conditioning stage in the form of a buck voltage converter 502, a switch module 504 in the form of a switching H bridge, a resonance circuit 506, and a transformer 508. The signal generator system 500 may represent an example implementation of the signal generator system 100 shown in FIG. 1A.

The buck voltage converter 502, the switch module 504, and the resonance circuit 506 may be referred together as a converter or signal generating module 510. For ease of exposition, only one signal generating module 510 (i.e., one buck voltage converter 502, one switch module 504, and one resonance circuit 506) is shown in FIG. 5. However, it should be appreciated that, similar to the signal generator system 100, the signal generator system 500 can include more than one signal generating module 510 (i.e., a plurality of buck voltage converters 502, a plurality of corresponding switch modules 504, and a plurality of corresponding resonance circuits 506). The output of each signal generating module 502 output can be coupled to the input of the transformer 508.

The buck voltage converter 502 can be configured to produce a DC voltage of $v_o$. This DC voltage can be directed to the switch module 502. The buck voltage converter 502 can adjust (e.g. increase or decrease) a DC voltage received from an input power supply to produce $v_o$. As shown in FIG. 5, the buck voltage converter 502 is an optional component of the signal generator system 500. In some embodiments, $v_o$ can be provided directly by a DC power supply.

The switch module 504 can operate in a plurality of modes. The plurality of modes can include an inactive mode, a half bridge mode (HBM) or a full bridge mode (FBM). In the inactive mode, the switch module 504 can output a constant DC voltage. In the HBM, the switch module 504 can be configured to output a square wave between 0 and $v_o$. In the FBM, the switch module 504 can be configured to output a square wave between $\pm v_o$. In the example described herein, the duty cycle may be assumed to be 50 percent and the excitation frequency can be variable over a range, however it will be understood that other suitable configurations can also be used. As shown in FIG. 5, the switch module 504 can receive a mode switch signal (e.g. converter switch signal or converter activation signal) that causes the switch module 504 to switch modes and/or to adjust the frequency and/or duty cycle of the output of the switch module 504. The HBM and FBM may be referred to as an active mode.

The resonance circuit 506 can include a plurality of passive reactive components. For example, the resonance circuit 506 can include a resonance capacitor. The output of the resonance circuit is fed to an input of the combining transformer 508. As shown in FIG. 5, the resonance circuit 506 is an optional component of the signal generator system 500. That is, in some embodiments, the output of the switch module 504 can be directly transmitted to the combining transformer 508.

The combining transformer 508 can include a primary winding and a secondary winding (not shown). The primary winding can operate as the input to the transformer 508 and the secondary winding can operate as an output to the transformer 508.

As shown in FIG. 5, v(t) denotes the output of the switch module 504. The switch module 504 may be approximated as ideal with negligible source impedance. Hence v(t) can be understood to be a square wave voltage source of very low equivalent impedance. Note that each of the inactive mode and the active modes (e.g. HBM and FBM) can be represented by v(t). That is, v(t)=c for the inactive mode, where c is a constant, and a square wave between 0 and $v_o$ for the HBM and $\pm v_o$ for FBM. As shown in FIG. 5, i(t) can be defined as the primary current into the transformer 508. The voltage across the resonance capacitor of the resonance circuit 506 can be defined as $v_c(t)$. The current in the secondary winding of the transformer 508 can be defined as $i_{sec}(t)$. Accordingly, the state vector for a single module (i.e., one buck voltage converter 502, one switch module 504, and one resonance circuit 506) can be represented by 3 variables, $\{i, i_{sec}, v_c\}$.

To model the transformer 508, the magnetization inductance referred to the primary side can be represented as $L_m$ and the leakage inductance of the primary side can be represented as $L_l$. Depending on the particular implementation, however, various different inductances may be used. In the simulation examples described herein below, the inductance parameters may be assigned the following values:

$$L_m = 190 \text{ uH}$$

$$L_l = 3.8 \text{ uH}$$

The turns ratio of the transformer 508 can be defined as $n_T$, which may be set as 5/4 in some examples. Depending on the particular implementation, however, various different turns ratios may be used. For a state space representation, the model of the transformer 508 can be represented as:

$$\begin{bmatrix} L11 & L12 \\ L12 & L22 \end{bmatrix} \begin{bmatrix} \frac{di}{dt} \\ \frac{disec}{dt} \end{bmatrix} = \begin{bmatrix} v \\ vsec \end{bmatrix}$$

where $v_{sec}$ is the voltage across the secondary winding of the transformer 508. The mutual inductance of $L_{12}$ can be defined as:

$$L_{12}=n_T L_m$$

$L_{11}$ represents the inductance of the primary winding. The inductance of the primary winding can include the combination of the leakage inductance and the magnetization inductance as referenced to the primary side and can be defined as:

$$L_{11}=L_l+L_m=L_l+n_T L_{12}$$

$L_{22}$ represents the inductance of the secondary winding. $L_{22}$ can be defined as:

$$L_{11}=n_T^2(L_l+L_m)=n_T^2 L_l+n_T L_{12}$$

The coupling coefficient of the transformer 508 can be defined as:

$$k = \frac{L12}{\sqrt{L11 L22}} = \frac{n_T L_m}{n_T \sqrt{(L_l+L_m)^2}} = \frac{L_m}{L_l+L_m}$$

Accordingly, the magnetization inductance and the leakage inductance for both the primary and secondary can be directly related to $L_{11}$, $L_{12}$ and $L_{22}$. This also leads to the two equivalent versions of the coupling coefficient, which may be in the vicinity of 98%.

$N_{tr}$ can represent the number of modules that are combined. The state equations can be represented in the matrix form of:

$$[A1]\left[\frac{ds}{dt}\right] = [A2]s + [B1]v$$

where s is the state vector which is ordered as {i1, isec, vc1} for a single module. For two modules it will be {i1, i2, isec, vc1, vc2} and so forth. A1, A2 and B1 are the coefficient matrices and v is the generator voltage supplied. Hence the set of equations can be given as:

$$L11\frac{di_n}{dt} + L12\frac{di_{sec}}{dt} = -v_{c,n} + v_n$$

$$\sum_{n=1}^{N_{tr}} L12\frac{di_n}{dt} + (N_{tr}L22+L_{sec})\frac{di_{sec}}{dt} = v_L$$

$$C\frac{dv_{c,n}}{dt} = i_n$$

where $v_{c,n}$ represents the voltage across the series resonance capacitor in the $n^{th}$ module, $v_n$ represents the switch module voltage output of the $n^{th}$ module and $v_L$ is the voltage across the output load. Also $L_{sec}$ represents an extra inductance that can be added to the load to represent the additional inductance of the wired connection from the secondary winding to the load. From these state space equations a state space formulation can be formed with a systems matrix of A, an input matrix of B and an output matrix C.

Additionally the output load can coupled into the state space. For example, the output load may be represented as which for this analysis is represented by a resistor R with an additional equation relating the input of $v_L$ to a scaled version of the output $i_{sec}$ as $$v_L = -R\, i_{sec}$$

The mode of each switch module only influences the coefficients of the B state space matrix. The system state space matrix of A or the output matrix of C is independent of the switch module mode setting. The overall transfer function of the state space can be given as $$H(s)=C(Is-A)^{-1}B$$

This can be also be represented as $$H(s) = \frac{C \mathrm{adj}(Is-A)B}{|Is-A|}$$

where adj(Is−A), s is the complex frequency and |Is−A| is the characteristic equation of A as a function of s. In this notation, if C is a row vector of coefficients such that a single state variable is selected for the output then the numerator and denominator will now be scalar polynomial functions of s. As shown, the denominator is independent of B and is therefore independent of the switch module modes. Accordingly, the poles of the state space transfer function, regardless of which state variable is selected by C is independent of the mode of the switch module in all the modules. Hence for all of the configurations of the signal generator system 500, the poles of any of the transfer functions is the same. It follows therefore that if the signal generator system 500 exhibits a modest resonance and that the zero phase intercept point of the transfer function falls within the range of the resonance then the numerator zeros will have little influence on the location of the zero phase intercept point along the frequency axis.

Reference is now made to FIGS. 6A-8F, which illustrate various example signal generator system 500 configurations and corresponding Bode plots. As will be shown below, the resonant frequency of the load may depend only mildly on the configuration or mode of the signal generator systems 600, 700, and 800. Accordingly, the target frequency identified in the low power mode may be transferred to the initial operational frequency in the higher power mode with little or no modification. Where there are differences in the zero phase (or minimum phase) frequency between different power modes (e.g. between the low power mode and a higher power mode), a prediction model can be used to map the frequency in the low power mode to the frequency in the high power mode (or an intermediate mode).

Figure 6A:
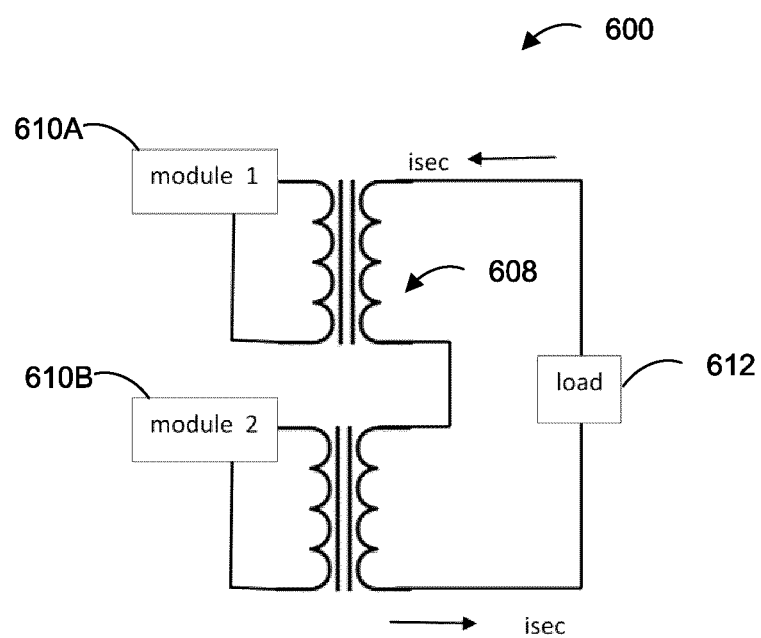
FIG. 6A is a circuit diagram of an example signal generator system in accordance with an embodiment.

Referring now to FIG. 6A, shown therein is an example signal generator system 600. Signal generator system 600 includes two converter modules 610A and 610B. Each of the converter modules 610A and 610B can include a switch module, such as switch module 120 and/or 504. Optionally, one or both of the converter modules 610 can include a conditioning stage such as the buck voltage converter 502. Optionally, one or both of the converter modules 610 can include a resonance circuit such as resonance circuit 506. Each converter module 610A and 610B can produce a signal that is combined by a transformer 608 into an output signal that is applied to a load 612. The output matrix C described above can be arranged to sample the primary current of the first module 610A.

Figure 6B:
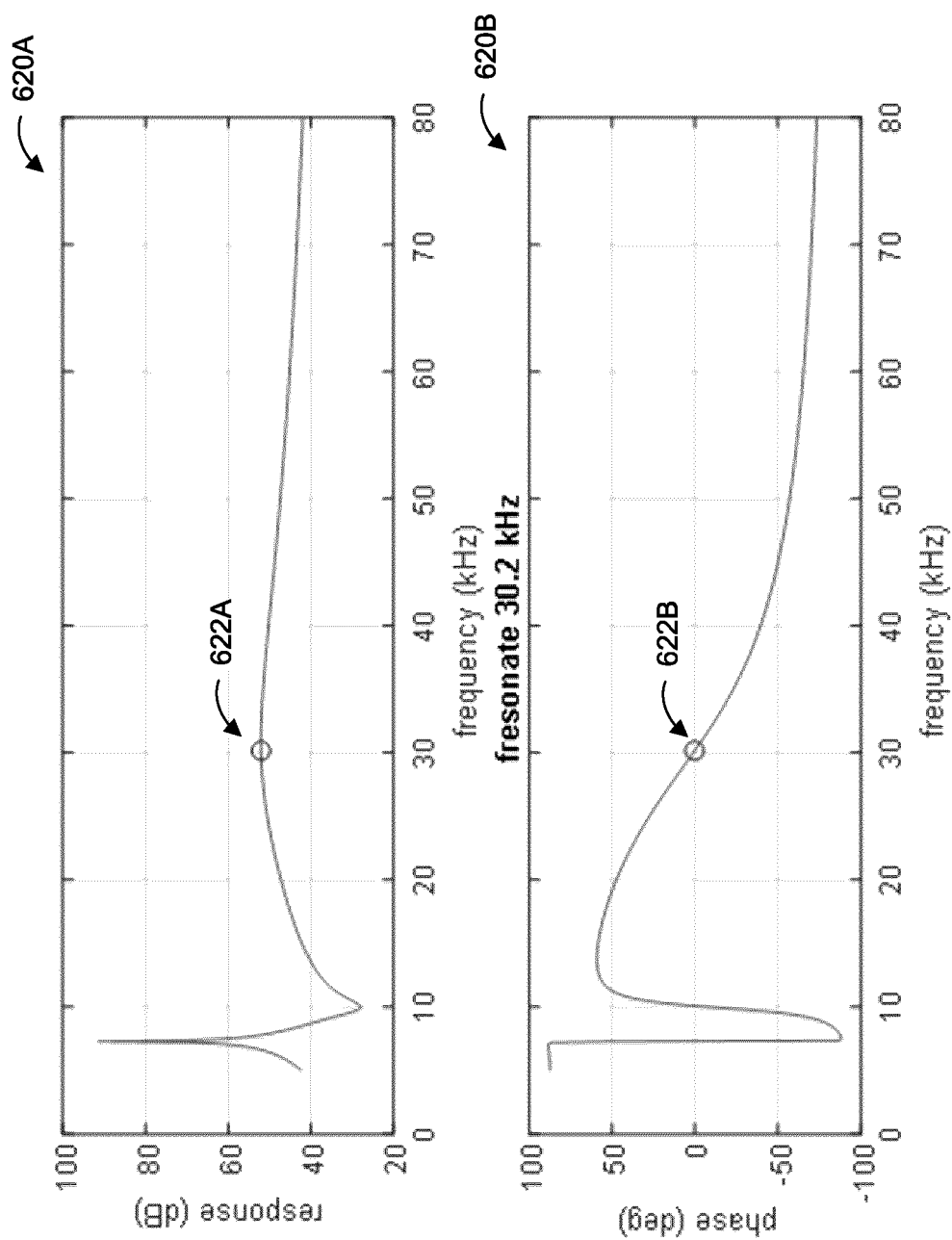
FIG. 6B is a plot illustrating an example of frequency response data that may be generated during operation of the signal generator system shown in FIG. 6A in accordance with an embodiment.

Referring now to FIG. 6B, shown therein are example Bode plots 620A and 620B of the signal generator system 600. The Bode plots 620A and 620B illustrate an example of the frequency response and phase when the signal generator system 600 is configured in a low power mode. In the low power mode, the first converter module 610A can operate in an active mode (in this case FBM) while the second converter module 610B operates in an inactive mode. The Bode plots 620A and 620B may be generated using the above noted mathematical derivations and values.

Bode magnitude plot 620A illustrates a magnitude of the frequency response of the signal generator system 600. Bode phase plot 620B illustrates the phase shift of the frequency response of the signal generator system 600. Points 622A and 622B shown in plots 620A and 620B indicate a resonant frequency where there is a zero phase shift and therefore a maximum amplitude. In the example shown, the low power resonant frequency is identified at of 30.2 kHz. Although the plots illustrate other frequencies with zero phase shift, in some cases lower frequencies may be omitted from consideration.

Figure 6C:
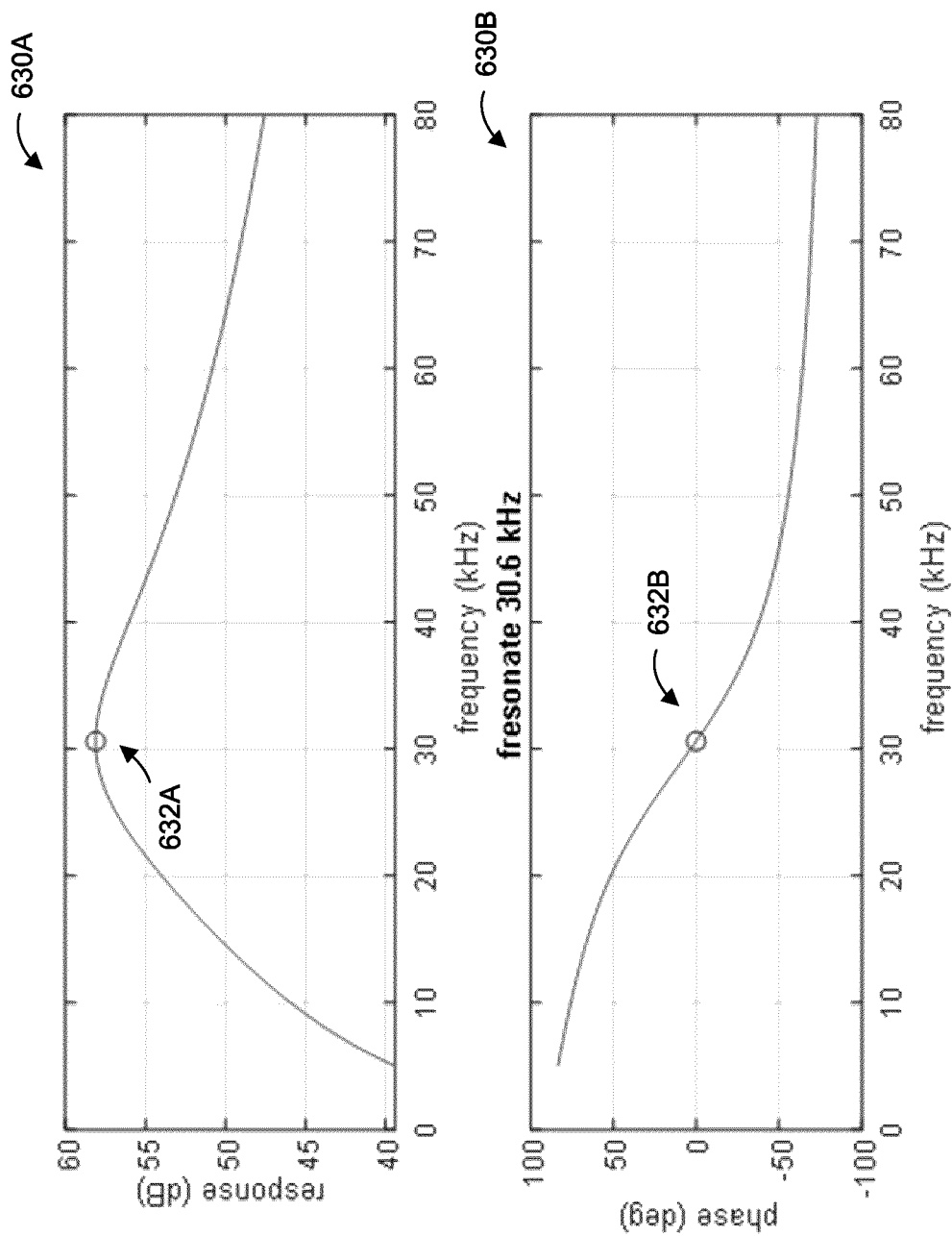
FIG. 6C is a plot illustrating another example of frequency response data that may be generated during operation of the signal generator system shown in FIG. 6A in accordance with an embodiment.

Referring now to FIG. 6C, shown therein are example Bode plots 630A and 630B of the signal generator system 600 when the signal generator system 600 is configured to operate in a high power mode. In the high power mode, both of the converter modules 610A and 610B are configured to operate in an active mode (in this example FBM). As shown in FIG. 6C, the resonance or the zero phase frequency (at points 632A and 632B) when the signal generator system 600 is in the high power mode is approximately the same frequency as when the signal generator system 600 is in the low power mode (e.g., points 622A and 622B shown in FIG. 6B). In the high power mode, the zero phase frequency has shifted slightly to 30.6 kHz. As noted above, this is a result of the poles of the two configurations being the same. The small change in the zero phase frequency from 30.2 to 30.6 kHz can be determined, for example by using a prediction model.

Figure 7A:
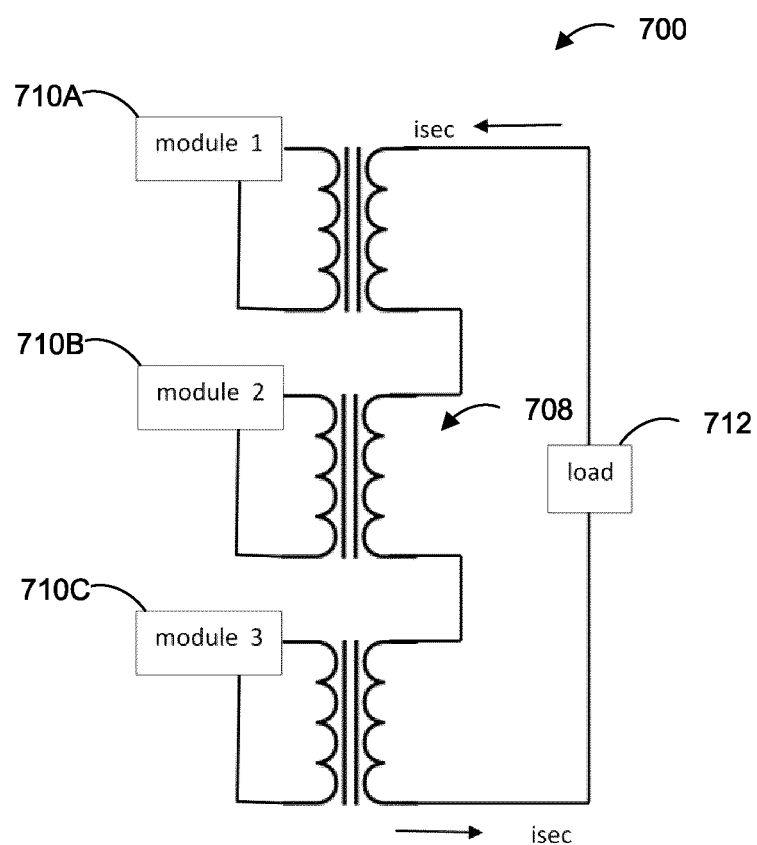
FIG. 7A is a circuit diagram of another example signal generator system in accordance with an embodiment.

Referring now to FIG. 7A, shown therein is another example signal generator system 700. The signal generator system 700 is generally similar to the signal generator system 600 shown in FIG. 6A, except that the signal generator system 700 further includes a third converter module 710C.

Figure 7B:
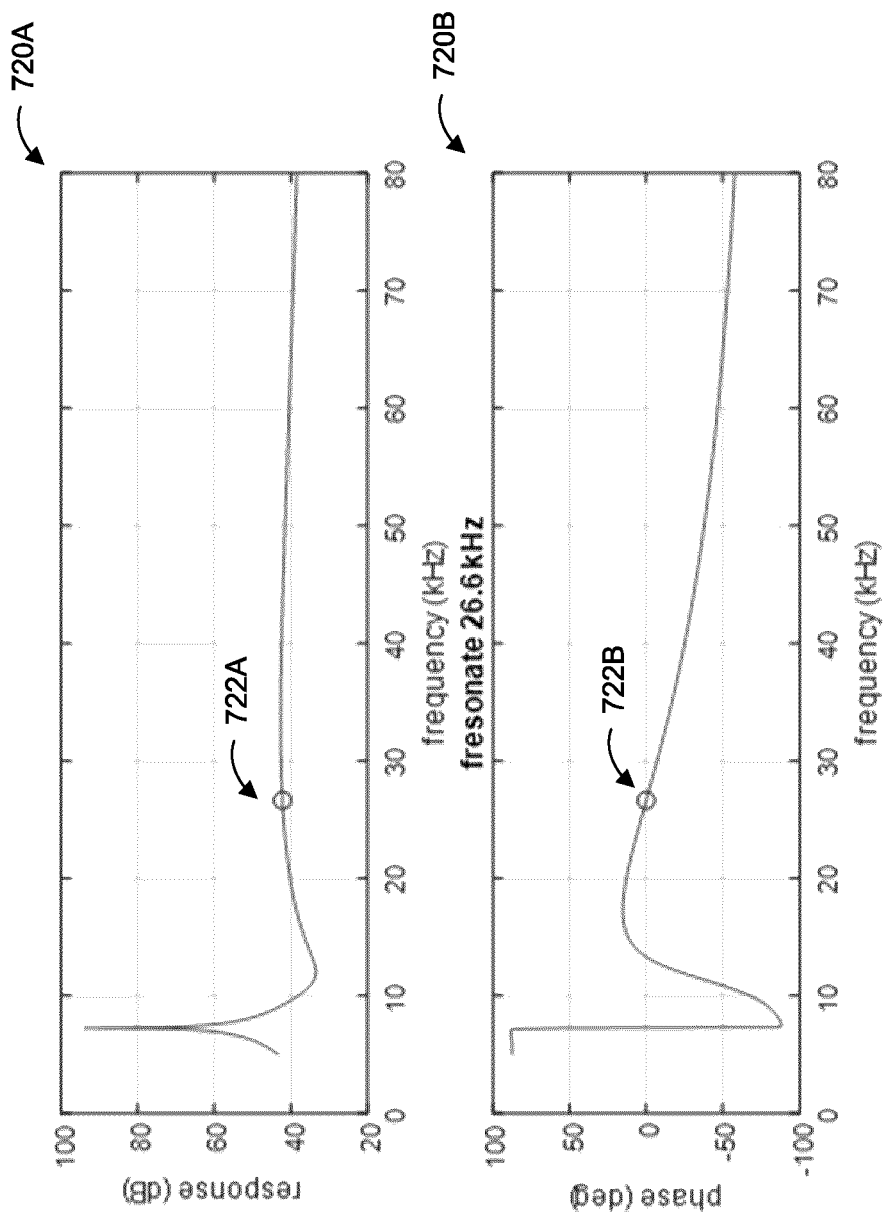
FIG. 7B is a plot illustrating an example of frequency response data that may be generated during operation of the signal generator system shown in FIG. 7A in accordance with an embodiment.

Referring now to FIG. 7B, there is shown magnitude and phase Bode plots 720A and 720B of the signal generator system 700 when the signal generator system 700 is operating in the low power mode. In the low power mode, the first converter module 710A is configured to operate in an active mode (in this example FBM) and the second and third converter modules 710B and 710C are in an inactive mode. A resonance frequency of 26.6 kHz is shown at points 722A and 722B. As shown in FIG. 7B, the resonance may be considered to be weakly defined. That is, the maximum magnitude corresponding to the resonance frequency is not well defined in magnitude Bode plot 720A.

Figure 7C:
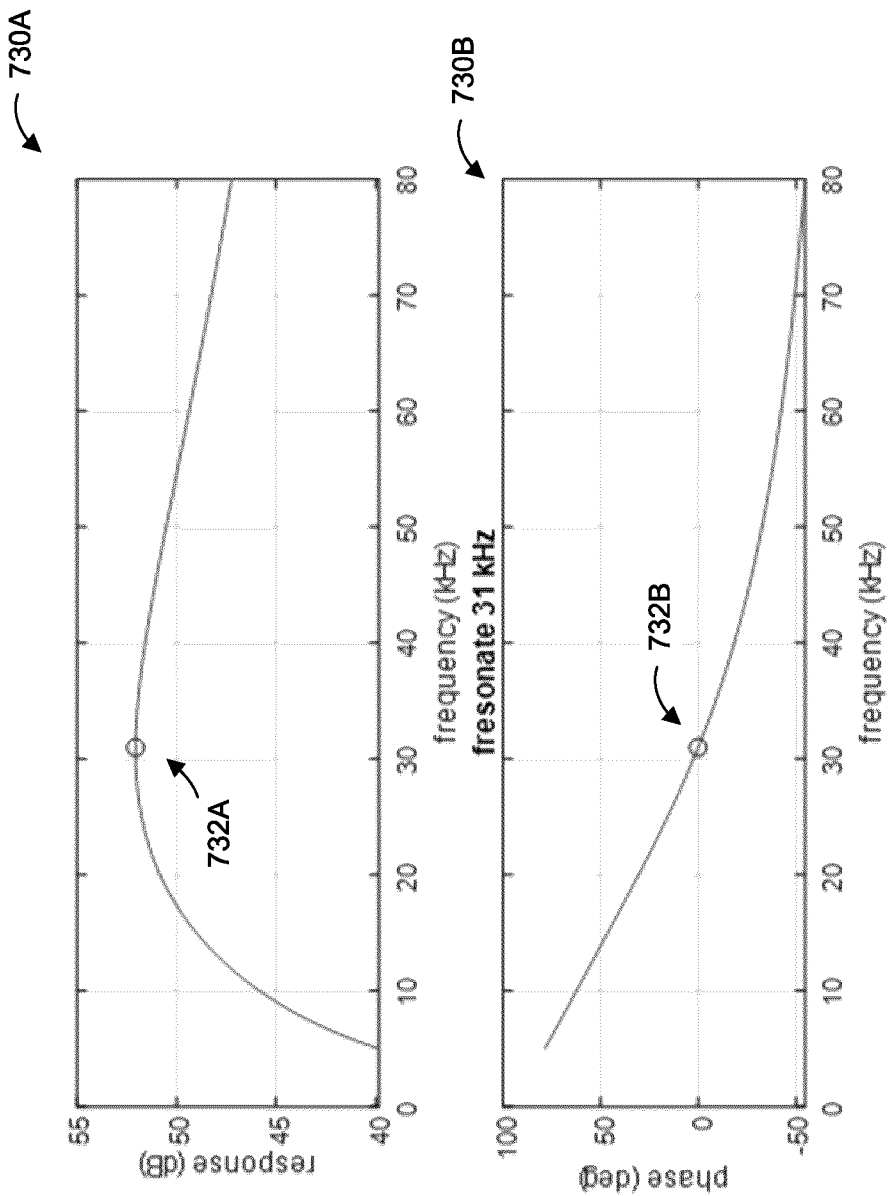
FIG. 7C is a plot illustrating another example of frequency response data that may be generated during operation of the signal generator system shown in FIG. 7A in accordance with an embodiment.

Referring now to FIG. 7C, there is shown magnitude and phase Bode plots 730A and 730B of the signal generator system 700 when the signal generator system 700 is in the higher power mode, when all three of the converter modules 710A, 710B, and 710C are configured to operate in an active mode (in this example FBM). A resonance frequency of 31 kHz is shown at points 732A and 732B. Although the resonance is better defined in comparison to the low power mode shown in FIG. 7B, there is a much larger difference in the resonance frequency between the low power mode and the high power mode. The zero phase frequency of the low power mode can be mapped to the frequency of the zero phase of the high power mode using a prediction model. Since the zero phase of the lower power mode falls within the negative slope region of the phase response in the high power configuration, a feedback control method may easily converge to the zero phase frequency of the high power configuration.

Figure 8A:
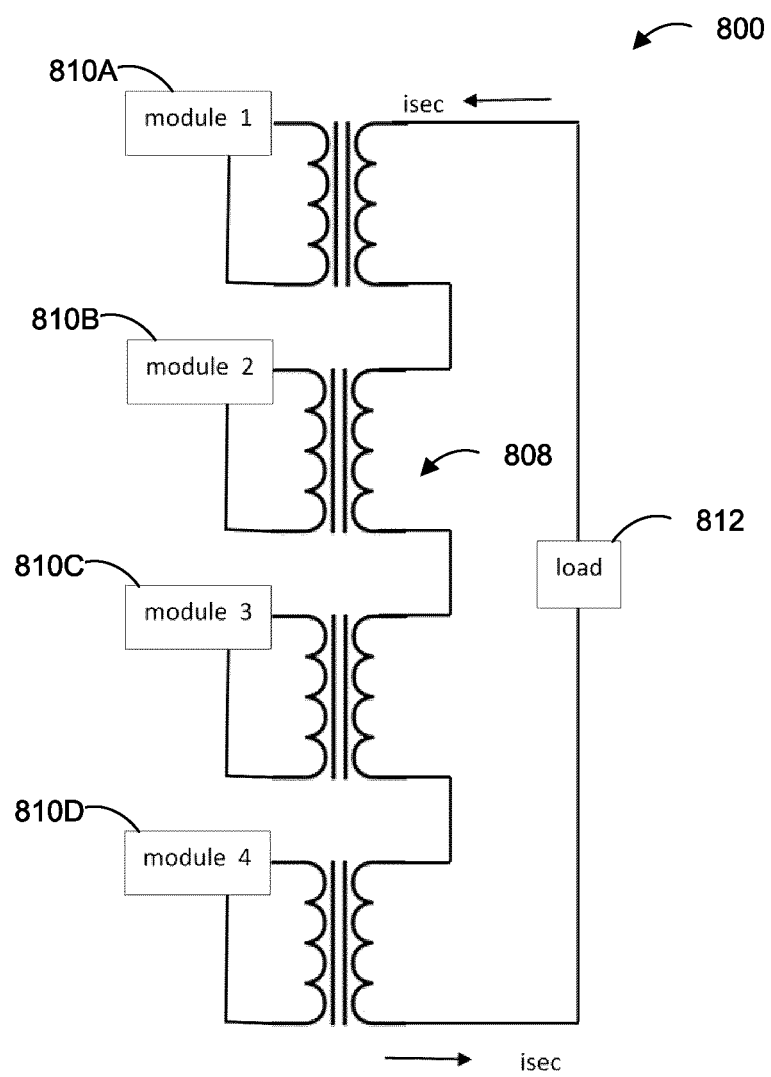
FIG. 8A is a circuit diagram of another example signal generator system in accordance with an embodiment.

Referring now to FIG. 8A, shown therein is an example signal generator system 800. The signal generator system 800 is generally similar to the signal generator system 700 shown in FIG. 7A, except that the signal generator system 800 further includes a fourth converter module 810D.

Figure 8B:
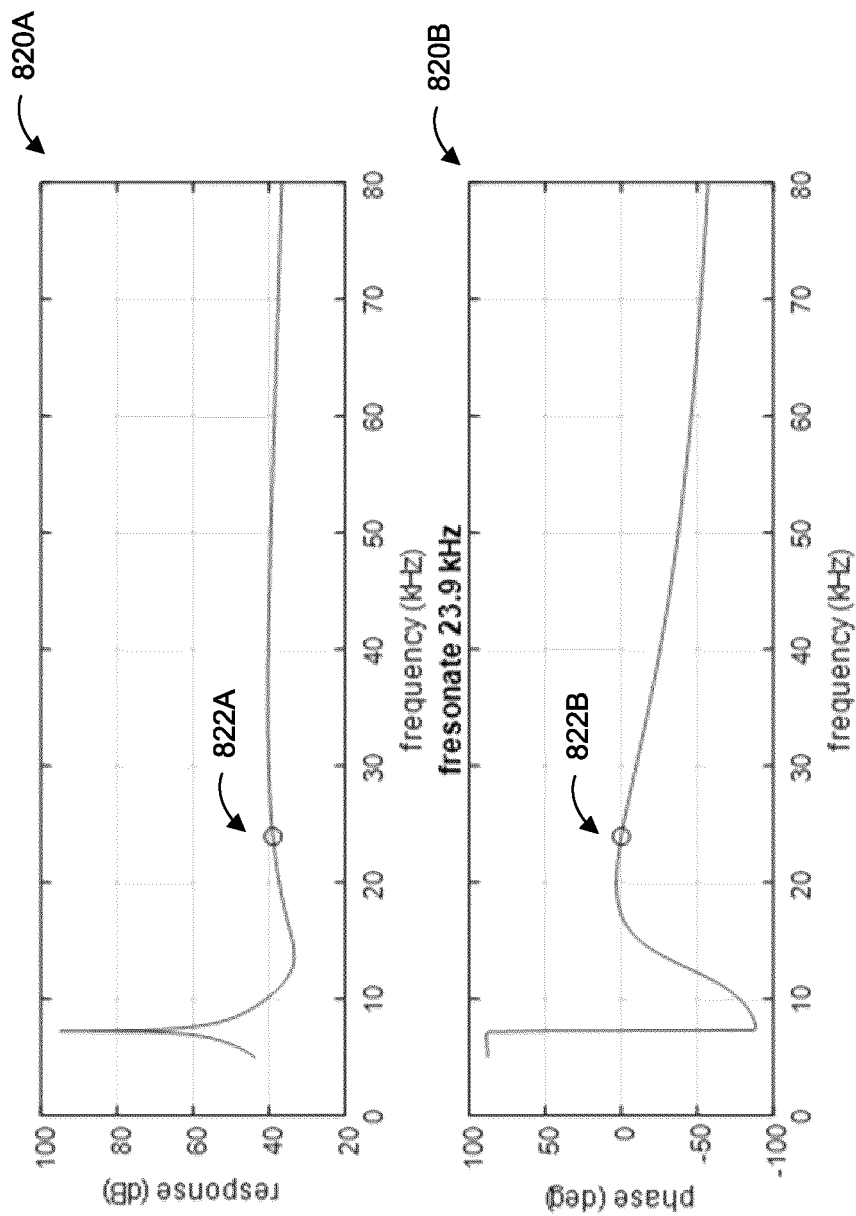
FIG. 8B is a plot illustrating an example of frequency response data that may be generated during operation of the signal generator system shown in FIG. 8A in accordance with an embodiment.

Referring now to FIG. 8B, shown therein are magnitude and phase Bode plots 820A and 820B of the signal generator system 800 operating in a low power configuration. In the low power configuration, a first converter module 810A is configured to operate in an active mode (in this example FBM), and the other three converter modules 810B, 810C, and 810D are configured to operate in an inactive mode. A zero phase frequency of 23.9 kHz is identified at points 822A and 822B. Similar to signal generator 800, plots 820A and 820B illustrate a weak resonance.

Figure 8C:
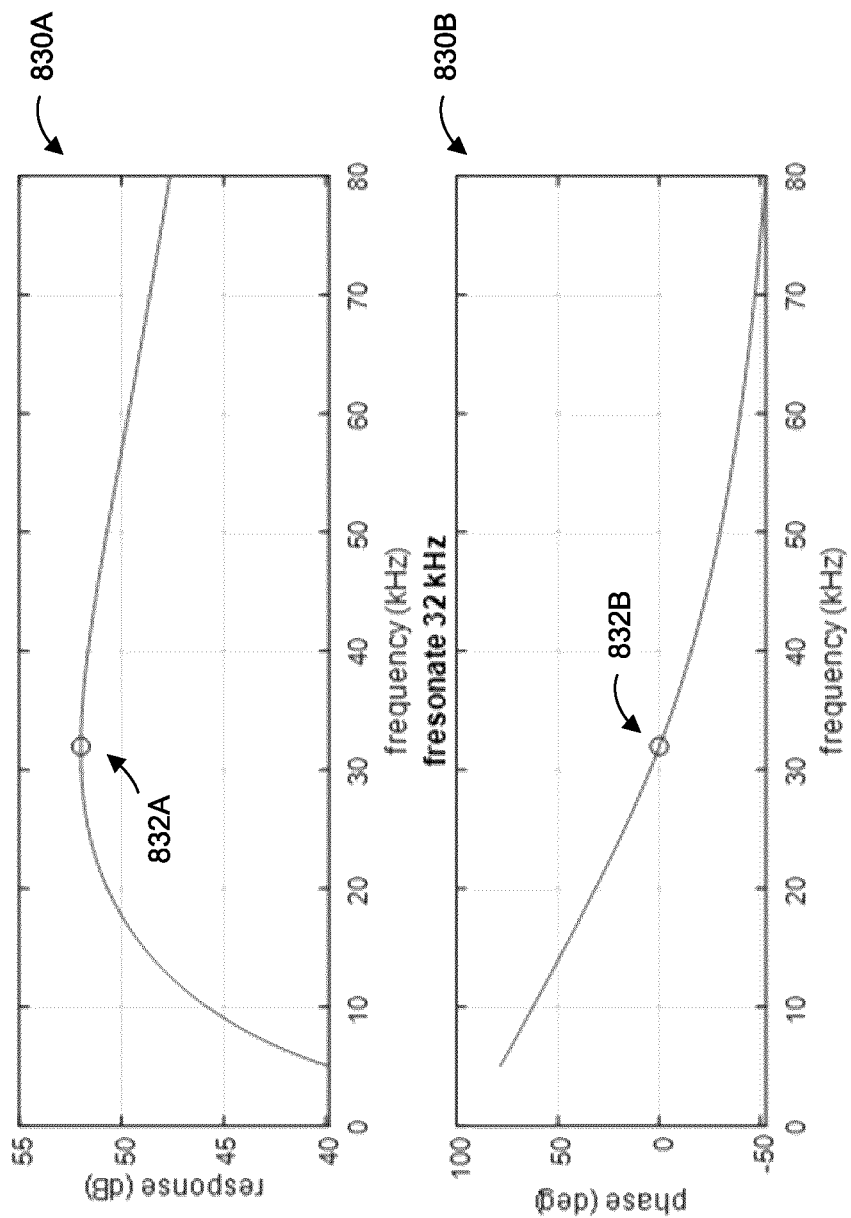
FIG. 8C is a plot illustrating an example of frequency response data that may be generated during operation of the signal generator system shown in FIG. 8A in accordance with an embodiment.

Referring now to FIG. 8C, there is shown magnitude and phase Bode plots 830A and 830B of the signal generator system 800 operating in a higher power mode, with all of the converter modules 810A, 810B, 810C, and 810D operating in an active mode (in this example FBM). As shown, the high power zero phase frequency is identified at 32 kHz (shown by points 832A and 832B). This higher power zero phase frequency can be determined from the zero phase frequency in the low power mode using a prediction model.

As discussed above, in some cases, the signal generator system 100 may initially configure the active converters 104 to operate at the low power zero phase frequency. The initial operational frequency may be subsequently adjusted to the high power zero phase frequency.

Figure 8D:
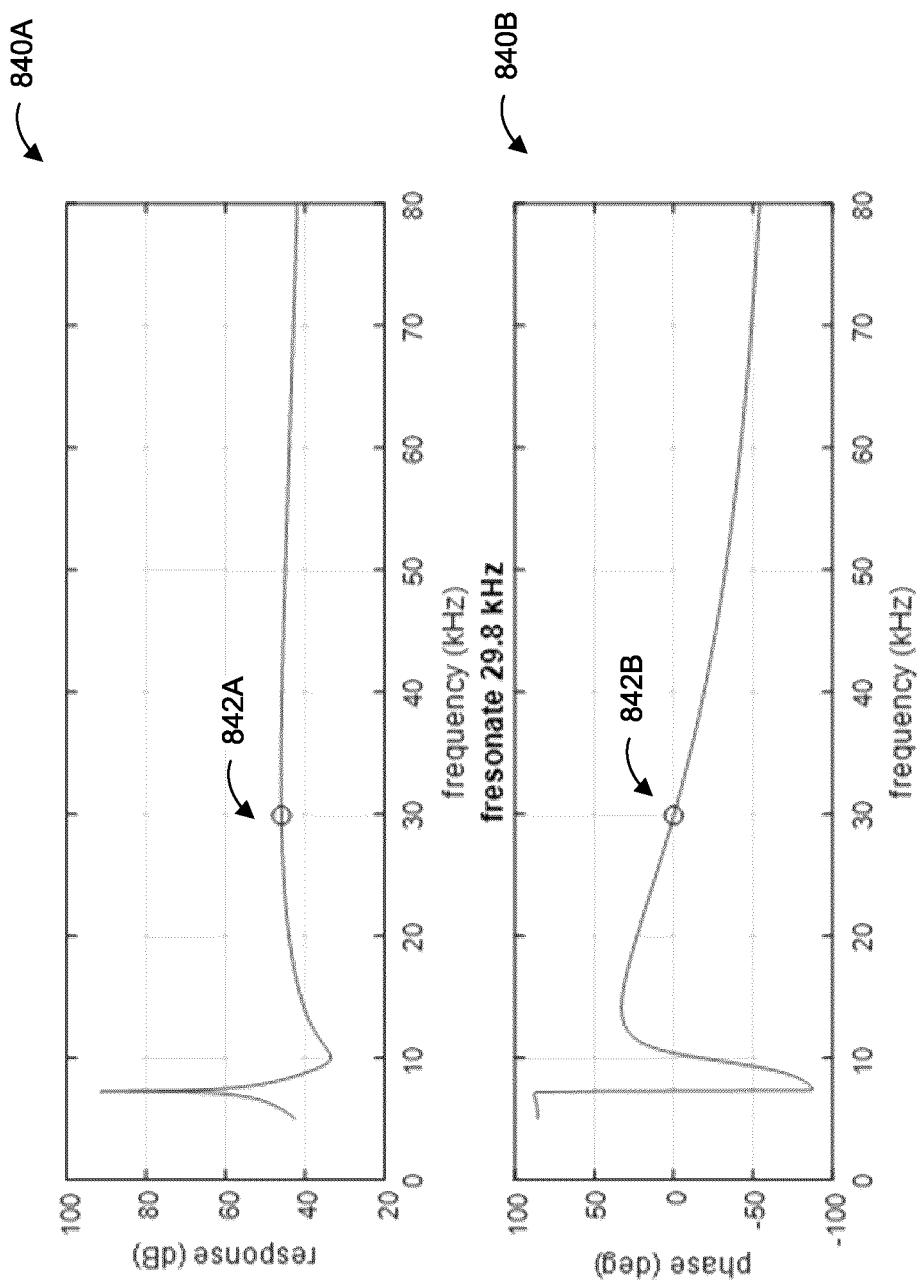
FIG. 8D is a plot illustrating an example of frequency response data that may be generated during operation of the signal generator system shown in FIG. 8A in accordance with an embodiment.

Referring now to FIG. 8D, there is shown magnitude and phase Bode plots 840A and 840B of the signal generator system 800 in another intermediate higher power mode, where two of the modules 810A and 810B are configured to operate in an active mode (in this example FBM) and two of the modules 810C and 810D are configured to operate in an inactive mode. The zero phase frequency of this higher power mode can be identified at 29.8 kHz (shown by points 842A and 842B). As shown in FIG. 8D, the resonance is more pronounced than in the low power mode shown in FIG. 8B. The general characteristic of the Bode plots typically will converge to the Bode plots of the high power mode shown in FIG. 8C as more of the inactive modules 810C and 810D are activated.

Figure 8E:
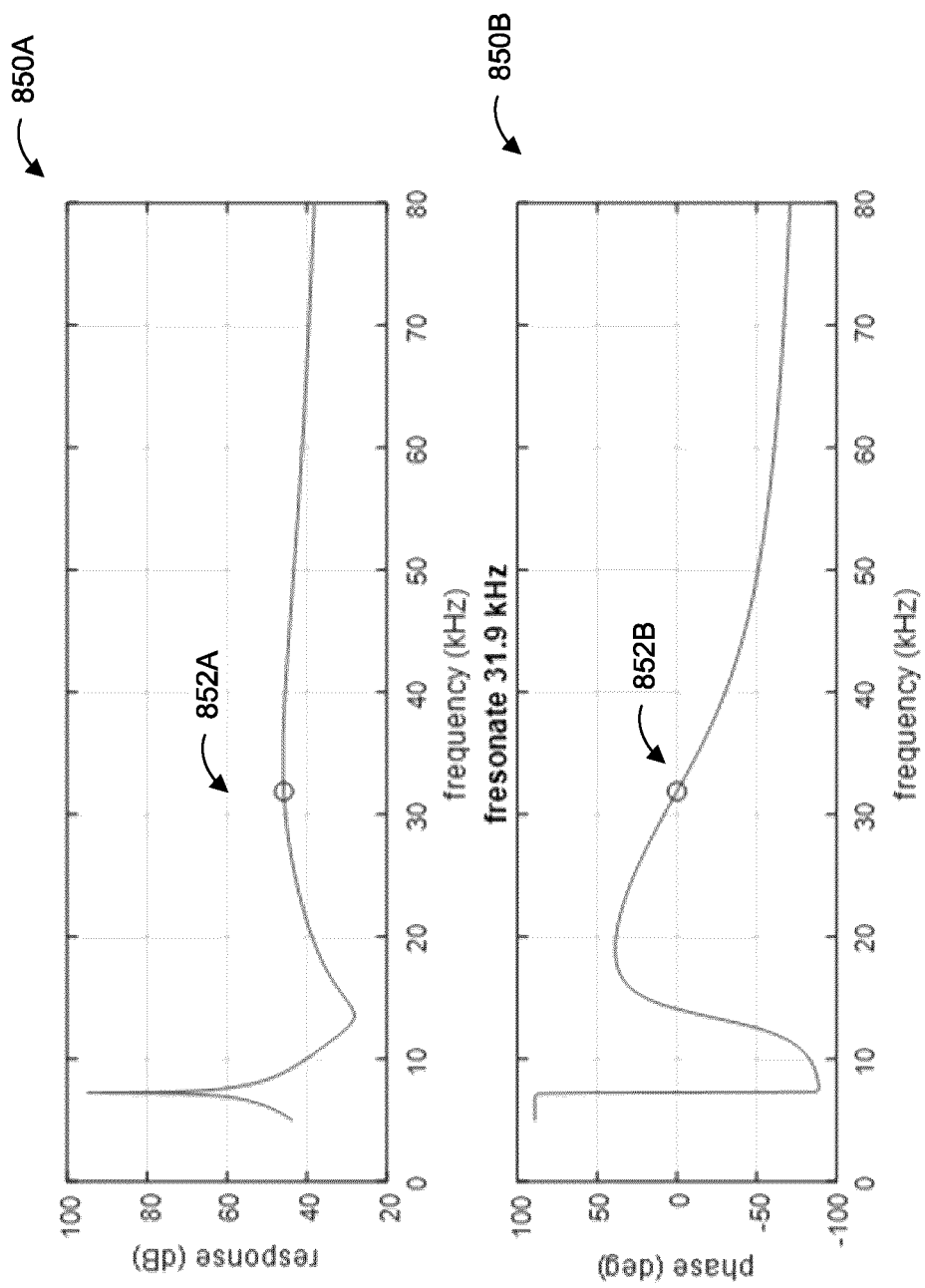
FIG. 8E is a plot illustrating an example of frequency response data that may be generated during operation of the signal generator system shown in FIG. 8A in accordance with an embodiment.

Referring now to FIG. 8E, there is shown magnitude and phase Bode plots 850A and 850B of the signal generator system 800 in a low power mode, where one module 810A is in an active mode (in this example FBM), and the other modules 810B, 810C, and 810D are in an inactive mode. However, in contrast with FIG. 8B, where the signal generator system 800 is also in a low power mode, FIG. 8E shows the frequency response of the signal generator system 800 when the load 812 has a relatively lower resistance.

Points 852A and 852B indicate a resonant or zero phase frequency of 31.9 kHz. When the load 812 has a relatively low impedance, the resonance is more pronounced in the low frequency mode and the zero phase frequency in the low power mode is closer to the zero phase frequency in the high power mode.

Figure 8F:
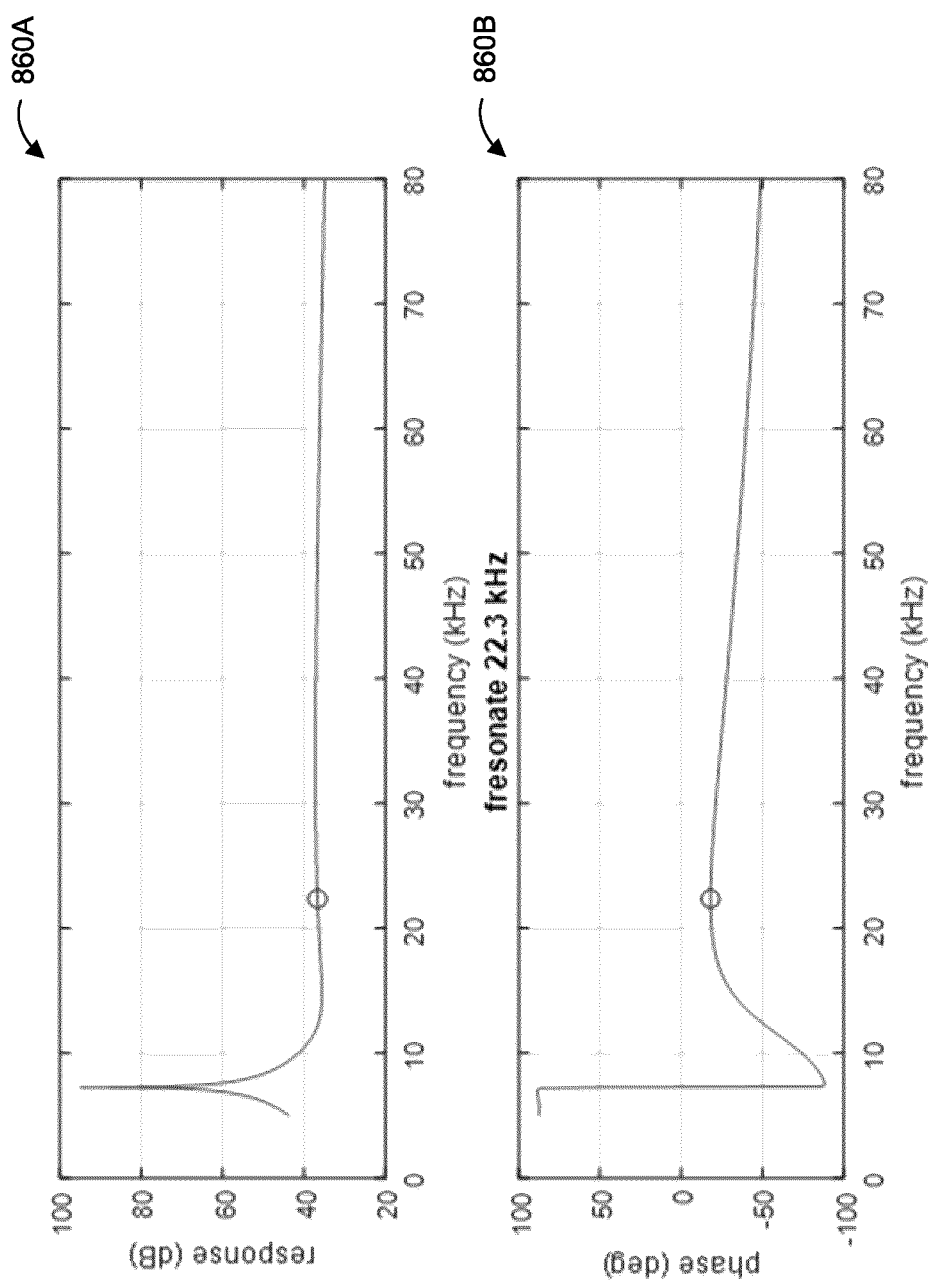
FIG. 8F is a plot illustrating an example of frequency response data that may be generated during operation of the signal generator system shown in FIG. 8A in accordance with an embodiment.

Referring now to FIG. 8F, there is shown magnitude and phase Bode plots 860A and 860B of the signal generator system 800 in a high power mode, where all of the modules 810A, 810B, 810C, and 810D are in FBM. However, in contrast to FIG. 8C, FIG. 8F shows the frequency response of the signal generator system 800 when the load 812 has a relatively high impedance. When the load 812 has a relatively high impedance, there is no zero phase condition. In such cases, the frequency with the smallest phase shift may be selected as the target frequency.

Referring to FIG. 9, shown therein is a profile view of an apparatus 1000 for electromagnetic heating of hydrocarbon formations in accordance with an embodiment. The apparatus 1000 can be used for electromagnetic heating of a hydrocarbon formation 1002. The apparatus 1000 includes an electrical power source 1006, an electromagnetic (EM) wave generator 1008, a waveguide portion 1010, and transmission line conductor portion 1012. As will be appreciated, the apparatus 1000 shown in FIG. 9 is provided for illustration purposes only and other suitable configurations of an apparatus for electromagnetic heating of hydrocarbon formations are possible.

As shown in FIG. 9, the electrical power source 1006 and the electromagnetic wave generator 1008 can be located at the surface 1004. Alternately, one or both of the electrical power source 1006 and the electromagnetic wave generator 1008 can be located below ground.

The electrical power source 1006 generates electrical power. The electrical power source 1006 can be any appropriate source of electrical power, such as a stand-alone electric generator or an electrical grid. The electrical power source 1006 may include transformers and/or rectifiers for providing a particular level of electrical power. The electrical power may be one of alternating current (AC) or direct current (DC). Power cables 1014 carry the electrical power from the electrical power source 1006 to the EM wave generator 1008.

The EM wave generator 1008 generates EM power. It will be understood that EM power can be generated in various forms including high frequency alternating current, alternating voltage, current waves, or voltage waves. For example, the EM power can be a periodic high frequency signal having a fundamental frequency (f0). The high frequency signal may have a sinusoidal waveform, square waveform, or any other appropriate signal shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 1008 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal. In embodiments described herein, the signal generator system 100 can be used as the EM wave generator 1008 in applications for heating hydrocarbon mediums.

As noted above, the EM wave generator 1008 may be located above-ground. An apparatus with the EM wave generator 1008 located above ground rather than underground can be easier to deploy.

Alternately, the EM wave generator may be located underground. When the EM wave generator 1008 is located underground, transmission losses may be reduced because EM energy is not dissipated in areas that do not produce hydrocarbons (e.g. along the waveguide portion distance between the EM wave generator 1008 and the transmission line conductor portion 1012).

The waveguide portion 1010 can carry high frequency alternating current from the EM wave generator 1008 to the transmission line conductors 1012a and 1012b. Each of the transmission line conductors 1012a and 1012b can be coupled to the EM wave generator 1008 via individual waveguides 1010a and 1010b. As shown in FIG. 9, the waveguides 1010a and 1010b can be collectively referred to as the waveguide portion 1010.

Each of the waveguides 1010a and 1010b can extend between a respective proximal end and a distal end. The proximal ends of each waveguide 1010a and 1010b can be connected to the EM wave generator 1008. The distal ends of each waveguide 1010a and 1010b can be connected to the transmission line conductors 1012a and 1012b respectively.

As shown in the example of FIG. 9, each waveguide 1010a and 1010b can be provided by a coaxial transmission line having an outer conductor 1018a and 1018b and an inner conductor 1020a and 1020b, respectively. For example, each of the waveguides 1010a and 1010b may be provided using a metal casing pipe as the outer conductor with the metal casings concentrically surrounding pipes, cables, wires, or conductor rods, as the inner conductors. Optionally, the outer conductors 1018a and 1018b can be positioned within at least one additional casing pipe along at least part of the length of the waveguide portion 1010.

The transmission line conductor portion 1012 can be coupled to the EM wave generator 1008 via the waveguide portion 1010. As shown in FIG. 9, the transmission line conductors 1012a and 1012b may be collectively referred to as the transmission line conductor portion 1012. In the example shown in FIG. 9, the transmission line conductor portion 1012 includes two transmission line conductors 1012a and 1012b. Optionally, the transmission line conductor portion 1012 may also include additional transmission line conductors.

In some embodiments the load 106 described above with respect to FIG. 1A can be the transmission line conductor portion 1012 and/or the waveguide portion 1010.

Various configurations of the transmission line conductors 1012a and 1012b may be used. For example, both transmission line conductors 1012a and 1012b may be defined by a pipe. Alternately, only one or none of the transmission line conductors 1012a and 1012b may be defined by a pipe.

Alternately or in addition, one or both of the transmission line conductors 1012a and 1012b may be provided using conductor rods, coiled tubing, or coaxial cables, or any other suitable conduit usable to transmit EM energy from EM wave generator 1008.

In the example shown in FIG. 9, the transmission line conductors 1012a and 1012b are positioned in direct contact with the hydrocarbon formation 1002. Alternately, the transmission line conductors 1012 may be electrically isolated or partially electrically isolated from the hydrocarbon formation 1002.

The transmission line conductors 1012a and 1012b have a proximal end and a distal end. The proximal end of each transmission line conductor 1012a and 1012b can be coupled to the EM wave generator 1008. For example, the proximal end of each transmission line conductor 1012a and 1012b can be coupled to the EM wave generator 1008 via the waveguide portion 1010.

The transmission line conductors 1012a and 1012b can be excited by the high frequency alternating current generated by the EM wave generator 1008. When excited, the transmission line conductors 1012a and 1012b can form an open transmission line between transmission line conductors 1012a and 1012b. The open transmission line can carry EM energy in a cross-section of a radius comparable to a wavelength of the excitation. The open transmission line can propagate an EM wave from the proximal end of the transmission line conductors 1012*a* and 1012*b* to the distal end of the transmission line conductors 1012*a* and 1012*b*.

Optionally, the EM wave may propagate as a standing wave. Alternately, the electromagnetic wave may propagate as a mixed standing wave. Alternately, the electromagnetic wave may propagate as a travelling wave.

An open transmission line can carry and dissipate energy within the dielectric medium. In the example of apparatus 1000, the hydrocarbon formation 1002 between the transmission line conductors 1012*a* and 1012*b* can act as a dielectric medium for the open transmission line formed by the transmission line conductors 1012*a* and 1012*b*. The open transmission line can carry and dissipate energy within this dielectric medium, that is, the hydrocarbon formation 1002.

The open transmission line formed by transmission line conductors 1012 and carrying EM energy within the hydrocarbon formation 1002 may be referred to as a "dynamic transmission line". The transmission line conductors 1012 can be configured to propagate an EM wave from the proximal end of the transmission line conductors 1012*a* and 1012*b* to the distal end of the transmission line conductors 1012*a* and 1012*b*. This can allow the dynamic transmission line to carry EM energy within long well bores (as used herein, well bores spanning a length of 500 meters (m) to 1500 meters (m) can be considered long well bored).

Producer well 1022 is located at or near the bottom of the underground reservoir. The producer well 1022 can be configured to receive heated oil released from the hydrocarbon formation 1002 by the EM heating process. The heated oil can drain mainly by gravity to the producer well 1022.

The producer well 1022 can define a longitudinal well axis. The transmission line conductors 1012*a* and 1012*b* may also extend along respective transmission line longitudinal axes. The longitudinal well axis and the transmission line longitudinal axes may be parallel or even coincident. Thus, the transmission lone conductors 1012*a* and 1012*b* may extend in a direction generally parallel to the producer well 1022 (e.g. along an axes coincident with a vertical projection of the producer well 1022).

As shown in the example of FIG. 9, producer well 1022 is substantially horizontal (i.e., parallel to the surface). The transmission line conductors 1012*a* and 1012*b* may also extend in a substantially horizontal direction.

The producer well 1022 may located at the same depth or at a greater depth than (i.e. below) at least one of the transmission line conductors 1012*a*, 1012*b* of the open transmission line 1012. Alternately, the producer well 1022 can be located above the transmission line conductors 1012*a*, 1012*b* of the open transmission line 1012.

The producer well 1022 may be positioned laterally in between the transmission line conductors 1012*a*, 1012*b*. For example, the producer well 1202 may be positioned centered between the transmission line conductors 1012*a*, 1012*b*. Alternately, the producer well 1022 may be positioned with any appropriate offset from the lateral center between the transmission line conductors 1012*a*, 1012*b*. In some applications, it may be advantageous to position the producer well 1022 closer to a first transmission line conductors than a second transmission line conductor. This may allow the region closer to the first transmission line conductor to be heated faster and contribute to early onset of oil production.

As the hydrocarbon formation 1002 is heated, steam may also be released that displaces the heated oil that has drained to and is collected in the producer well 1022. The steam can accumulate in a steam chamber above the producer well 1022. Direct contact between the steam chamber and the producer well 1022 can result in a drop in system pressure, which can increase steam and water production but reduces oil production. Thus, maintaining separation between the steam chamber and the producer well 1022 for as long as possible during operation may facilitate increased oil production.

The open transmission line provided by the transmission line conductors 1012 may facilitate providing wide and flat heated areas. The width of the heated area can be varied by adjusting the lateral separation between the transmission line conductors 1012*a* and 1012*b*. However, the hydrocarbon formation 1002 between the transmission line conductors 1012*a* and 1012*b* may not be heated uniformly until the whole hydrocarbon formation 1002 between the transmission line conductors 1012*a* and 1012*b* is desiccated. Regions closer to the respective transmission line conductors 1012*a* and 1012*b* may initially be heated much more strongly than the regions further from the transmission line conductors 1012*a* and 1012*b*, including the region between the transmission line conductors 1012*a* and 1012*b*.

In some applications, it can be advantageous for the distance between the transmission line conductors 1012*a* and 1012*b* to be narrow to encourage early onset of oil production. However, a wider distance (e.g. larger than 8 meters) between the transmission line conductors 1012*a* and 1012*b* may encourage long term oil production by maintaining a separation between the producer well 1022 and the steam chamber (i.e., maintaining a disconnected steam chamber).

Underground reservoir simulations indicate that heating a wide, flat and uniform area approximately 2 meters to 8 meters above the producer well 1022 can create a steam chamber that is more favorable than when the heated area is narrow, even if the total EM power used for heating is the same. In this context, a region of approximately 8 meters to 40 meters can be considered wide while a region with a width of less than approximately 8 meters can be considered narrow. A more favorable steam chamber is a chamber which stays 'disconnected' (i.e., remains separated) from the producer well 1022 for a longer period of time.

It may also be desirable to maximize the efficiency of the reservoir heating, to promote the cost effectiveness of oil production. By focusing the reservoir heating on oil producing regions of the hydrocarbon formations, radiation losses may be reduced and thus the overall production costs (both in terms of monetary value and energy costs) may be reduced.

Producing heat laterally far from the open transmission line, while minimizing heating of the under-burden (i.e., region below the underground reservoir) and/or over-burden layers (i.e., region above the underground reservoir) may promote efficiency in the oil production process. Heating of the under-burden region and/or over-burden region does not generally result in oil production, and therefore the energy used to heat these regions effectively represents radiation losses.

The EM wave generator 1008 may be configured to accommodate a wide impedance range. The electromagnetic properties of the hydrocarbon formation 1002 may vary significantly throughout the heating process, and thus the EM wave generator 1008 may be operable to respond to changes in the hydrocarbon formation 1002.

The heating of hydrocarbon formation 1002 can may described by four distinct heating phases, in which different electromagnetic, thermodynamic, and fluid-dynamic mechanisms may be present. Depending on the length of the transmission line conductors 1012, the various properties of the hydrocarbon formation 1002, and the desired heating strategy, it may be desirable to operate the apparatus 1000 to transition between these different heating phases at different times.

In a first heating phase, a high concentration of water may be present in the regions of the hydrocarbon formation 1002 surrounding the transmission line conductors 1012. As a result, impedance experienced by EM waves propagating along the transmission line conductors 1012 will be mostly resistive and high frequencies of the EM waves will be greatly attenuated.

In a second heating phase, water begins to diffuse away from the transmission line conductors 1012. The water reduction can decrease the conductivity of the hydrocarbon formation 1002. At the same time, the temperature of the hydrocarbon formation 1002 around the transmission line conductors 1012 increases. This increase in temperature can increase the conductivity of the hydrocarbon formation 1002, counteracting some or all of the decrease caused by the water reduction.

In a third heating phase, water around the transmission line conductors 1012 vaporizes and carries heat away from the transmission line conductors 1012. The vaporized water can then condense and diffuse back toward the transmission line conductors 1012, due to a water concentration gradient.

In a fourth heating phase, hydrocarbons begin to flow into the producer well 1022, reducing the pressure in the regions of the hydrocarbon medium 1002 near the transmission line conductors 1012. More steam is produced in this region, lowering the water concentration, and increasing the resistance.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A signal generator system comprising:
   a transformer unit comprising a primary input side and a secondary output side connectable to a load, wherein the primary input side includes a plurality of parallel input sections and the secondary output side includes a plurality of output sections connected in series with each output section corresponding to one of the input sections;
   a plurality of converters, wherein each converter has a converter input, a converter output, and a switch module positioned between the converter input and the converter output, the switch module operable to control a direction of current flow through the converter output, wherein the switch module is adjustable between a plurality of switch states, and each converter is adjustable between a plurality of operational modes, wherein the plurality of operational modes include at least one active mode and at least one inactive mode; and
   a controller configured to adjust the operational mode of each converter;
   wherein
   the converter inputs are connected to a power supply unit;
   the converter outputs are connected in parallel to the primary input side of the transformer unit, wherein each converter output is connected to one of the input sections of the primary input side of the transformer unit;
   for each converter,
     when the converter is in any one of the active modes, the switch module is configured to switch between the plurality of switch states according to a converter switching pattern whereby an output RF signal is induced in the output section corresponding to that converter; and
     when the converter is in the inactive mode, the switch module is maintained in a fixed switch state whereby the converter input is decoupled from the output section corresponding to that converter;
   the system is operable in a low power mode in which a particular converter in the plurality of converters is in the at least one active mode and every other converter is in the active mode;
   the system is operable in a high power mode in which multiple converters in the plurality of converters are in the at least one active mode, wherein in the high power mode a switching frequency of the converter switching pattern of each converter that is operable in any of the active modes is the same; and
   the controller is configured to determine an initial operational frequency while operating the system the low power mode and to subsequently configure the system to operate in the high power mode using the initial operational frequency by setting switching frequency of the converter switching pattern of each converter that is operable in any of the active modes to be the initial operational frequency.

2. The signal generator system of claim 1, wherein for each converter the controller is configured to adjust the operational mode of that converter by transmitting a converter switch signal to that converter, wherein the converter switch signal is usable by the converter to define the converter switching pattern and thereby the operational mode of the switch module.

3. The signal generator system of claim 2, wherein the controller is configured to control a magnitude of the output RF signal by adjusting the operational mode of at least one converter.

4. The signal generator system of claim 2, wherein the controller is configured to determine a desired switching pattern for each converter, and the converter switch signal transmitted to each converter is usable by the converter to define the converter switching pattern as the desired switching pattern and thereby the operational mode for that converter.

5. The signal generator system of claim 4, wherein the controller is configured to determine the desired switching pattern for each converter independently.

6. The signal generator system of claim 4, wherein the controller is configured to:
   determine a desired output signal to be applied to the load; and
   determine the desired switching pattern for each converter by determining a combination of switching patterns usable to generate the desired output signal.

7. The signal generator system of claim 1, wherein:
   the at least one active mode comprises a plurality of active operational modes including a full bridge active mode and a half bridge active mode; and
   for each converter, when that converter is adjusted to the full bridge active mode, the switch module of that converter is configured to operate as a full bridge inverter; and when that converter is adjusted to the half bridge active mode, the switch module of that converter is configured to operate as a half bridge inverter.

8. The signal generator system of claim 1, wherein the controller is configured to control a magnitude of the output RF signal by cycling the operational mode of at least one converter between at least two operational modes in the plurality of the operational modes.

9. The signal generator system of claim 1, wherein the controller is configured to determine the initial operational frequency by:
adjusting the particular converter to one of the active modes and adjusting all of the other converters to the inactive mode;
defining a plurality of test frequencies;
identifying a set of feedback measurements for each test frequency in the plurality of test frequencies by:
adjusting a switching frequency of the converter switching pattern of the particular converter to the test frequency; and
determining a feedback measurement; and
selecting the initial operational frequency based on the set of feedback measurements measured for the plurality of test frequencies.

10. The system of claim 9, wherein:
the feedback measurement is determined by measuring a feedback voltage and a feedback current and identifying a phase shift between the feedback voltage and the feedback current for that test frequency; and
the initial operational frequency is determined based on the set of phase shifts identified for the plurality of test frequencies.

11. The system of claim 10, wherein the initial operational frequency is determined by:
identifying a particular phase shift from the set of phase shifts as the smallest phase shift in the set of phase shifts that satisfies specified operational constraints of the signal generator system; and
defining the initial operational frequency as the test frequency corresponding to the identified particular phase shift.

12. The system of claim 1, wherein the initial operational frequency is selected to increase switching efficiency by soft switching the converters.

13. A signal generator system comprising:
a transformer unit comprising a primary input side and a secondary output side connectable to a load, wherein the primary input side includes a plurality of parallel input sections and the secondary output side includes a plurality of output sections connected in series with each output section corresponding to one of the input sections;
a plurality of converters wherein each converter has a converter input, a converter output, and a switch module positioned between the converter input and the converter output, the switch module operable to control a direction of current flow through the converter output, wherein the switch module is adjustable between a plurality of switch slates, and each converter is adjustable between a plurality of operational modes, wherein the plurality of operational modes include at least one active mode and at least one inactive mode; and
a controller;
wherein
the converter inputs are connected to a power supply unit;
the converter outputs are connected in parallel to the primary input side of the transformer unit, wherein each converter output is connected to one of the input sections of the primary input side of the transformer unit;
for each converter,
when the converter is in any one of the active modes, the switch module is configured to switch between the plurality of switch states according to a converter switching pattern whereby an output RF signal is induced in the output section corresponding to that converter; and
when the converter is in the inactive mode, the switch module is maintained in a fixed switch state whereby the converter input is decoupled from the output section corresponding to that converter;
at least one converter in the plurality of converters includes a conditioning stage operable to adjust a level of the voltage received from the power supply unit; and
the controller is configured to:
transmit a converter activation signal to a particular converter wherein the converter activation signal is usable by that particular converter to adjust that particular converter from the inactive mode to the at least one active mode; and
transmit a smoothing signal to the at least one converter wherein the smoothing signal is usable by the at least one converter to control the conditioning stage of the at least one converter to smooth a transition of the magnitude of a voltage through the secondary output side as the particular converter is adjusted from the inactive mode to one of the active modes.

14. The system of claim 13, wherein the controller is further configured to control a magnitude of the output RF signal by transmitting a voltage level signal to each converter in the at least one converter, wherein the voltage level signal is usable by the converter to control a voltage output of the conditioning stage.

15. The system of claim 13, further comprising a resonance circuit, wherein the controller is configured to adjust the resonance circuit based on a load reactance of the load when the secondary output side is connected to the load.

16. The system of claim 13, wherein the load comprises at least one frequency dependent signal emission structure.

17. The system of claim 16, wherein the at least one frequency dependent signal emission structure is positioned in a hydrocarbon medium.

18. The system of claim 13, wherein each converter comprises at least one resonance capacitor coupled between the switch module and the converter output.

19. A signal generator system comprising:
a transformer unit comprising a primary input side and a secondary output side connect able to a load, wherein the primary input side includes a plurality of parallel input sections and the secondary output side includes a plurality of output sections connected in series each output section corresponding to one of the input sections;
a plurality of converters, wherein each converter has a converter input, a converter output, and a switch module position between the converter input and the converter output, the switch module operable to control a direction of current flow through the converter output, wherein the switch module is adjustable between a plurality of switch slates, and each converter is adjustable between a plurality of operational modes, wherein the plurality of operational modes include at least one active mode and at least one inactive mode; and a plurality of bypass switches, wherein each bypass switch is coupled to a corresponding output section in the plurality of output sections, and each bypass switch is adjustable between an open position in which the converter is coupled to the load via the output section, and a closed position in which the bypass switch defines a short circuit across the output section thereby decoupling the converter from the load;

wherein the converter inputs are connected to a power supply unit;

the converter outputs are connected in parallel to the primary input side of the transformer unit, wherein converter output is connected to one of the input sections of the primary input side of the transformer unit; and for each converter,
- when the converter is in any one of the active modes, the switch module is configured to switch between the plurality of switch states according to a converter switching pattern whereby an output RF signal is induced in the output section corresponding to that converter; and
- when the converter is in the inactive mode, the switch module is maintained in a fixed switch state whereby the converter input is decoupled from the output section corresponding to that converter.

20. The system of claim 19, wherein for each converter, when the converter is in the inactive mode, the fixed switch state of the switch module defines a short circuit at the converter output.

* * * * *